US009538245B2

(12) United States Patent
Cho et al.

(10) Patent No.: US 9,538,245 B2
(45) Date of Patent: Jan. 3, 2017

(54) MEDIA SYSTEM AND METHOD OF PROVIDING RECOMMENDED SEARCH TERM CORRESPONDING TO AN IMAGE

(71) Applicant: LG ELECTRONICS INC., Seoul (KR)

(72) Inventors: Sungil Cho, Pyeongtaek-si (KR); Guang Jang, Pyeongtaek-si (KR); Jinhae Choi, Pyeongtaek-si (KR); Kyungin Yang, Pyeongtaek-si (KR); Jiyoung Hong, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/872,348

(22) Filed: Apr. 29, 2013

(65) Prior Publication Data

US 2013/0298162 A1 Nov. 7, 2013

(30) Foreign Application Priority Data

May 7, 2012 (KR) ........................ 10-2012-0048151

(51) Int. Cl.
*H04N 21/4722* (2011.01)
*H04N 21/234* (2011.01)
(Continued)

(52) U.S. Cl.
CPC .... *H04N 21/4722* (2013.01); *G06F 17/30247* (2013.01); *H04N 21/23418* (2013.01);
(Continued)

(58) Field of Classification Search
CPC ..................... H04N 21/23418; H04N 21/4316; H04N 21/4622; H04N 21/4722; H04N 21/4782
See application file for complete search history.

(56) References Cited

U.S. PATENT DOCUMENTS 6,006,225 A * 12/1999 Bowman ........... G06F 17/30395
7,000,242 B1 * 2/2006 Haber ............... G06F 17/30274
715/719
(Continued)

FOREIGN PATENT DOCUMENTS

CN 1402853 A 3/2003
CN 102164254 A 8/2011
(Continued)

OTHER PUBLICATIONS

European Search Report dated Oct. 21, 2014 issued in Application No. 13 001 646.2.
(Continued)

*Primary Examiner* — Robert Hance
(74) *Attorney, Agent, or Firm* — KED & Associates LLP

(57) ABSTRACT

A media system and a method of providing recommended search term corresponding to an image are disclosed. Herein, a display device may be configured to display a still image of the content and a search window on a display screen. And, an electronic device may be configured to verify whether or not an image or a portion of the image has been dragged to the displayed search window, wherein the image may be included in the still image, and, when the image or the portion of the image has been dragged to the search window, the electronic device may be configured to send directions to the display device, so that the display device can display multiple search terms related to the image or the portion of the image as recommended search term on the search window.

19 Claims, 19 Drawing Sheets

(51) Int. Cl.
*H04N 21/462* (2011.01)
*H04N 21/431* (2011.01)
*H04N 21/4782* (2011.01)
*H04N 21/4725* (2011.01)
*H04N 21/4728* (2011.01)
*G06F 17/30* (2006.01)

(52) U.S. Cl.
CPC ..... *H04N 21/4316* (2013.01); *H04N 21/4622* (2013.01); *H04N 21/4725* (2013.01); *H04N 21/4728* (2013.01); *H04N 21/4782* (2013.01)

(56) References Cited

U.S. PATENT DOCUMENTS

| | | | | |
|---|---|---|---|---|
| 2003/0079224 | A1* | 4/2003 | Komar | H04N 5/44591 725/32 |
| 2004/0104926 | A1* | 6/2004 | Murray | G06F 3/0481 715/719 |
| 2005/0044565 | A1* | 2/2005 | Jerding | H04N 5/44543 725/37 |
| 2006/0117352 | A1* | 6/2006 | Yamagata | G11B 27/105 725/50 |
| 2007/0005576 | A1* | 1/2007 | Cutrell | G06F 17/30979 |
| 2007/0250511 | A1* | 10/2007 | Endler | G06F 17/30864 |
| 2008/0127255 | A1* | 5/2008 | Ress | H04N 7/17318 725/38 |
| 2008/0226119 | A1* | 9/2008 | Candelore | G06F 17/30256 382/100 |
| 2008/0320546 | A1* | 12/2008 | Moon | H04N 7/17318 725/136 |
| 2009/0112848 | A1* | 4/2009 | Kunjithapatham | G06F 17/30796 |
| 2009/0113475 | A1* | 4/2009 | Li | G06F 17/30817 725/39 |
| 2009/0254946 | A1* | 10/2009 | Vogel | H04N 5/4403 725/60 |
| 2011/0113444 | A1* | 5/2011 | Popovich | G06F 17/3079 725/32 |
| 2011/0113445 | A1* | 5/2011 | Lee | G06F 17/30696 725/37 |
| 2011/0131605 | A1* | 6/2011 | Pratt | G06F 17/30994 725/39 |
| 2011/0178871 | A1 | 7/2011 | Watfa et al. | 705/14.53 |
| 2011/0282906 | A1 | 11/2011 | Wong | 707/780 |
| 2011/0302613 | A1* | 12/2011 | Joshi | H04N 7/17318 725/60 |
| 2012/0296926 | A1* | 11/2012 | Kalin | G06F 17/3097 707/765 |
| 2013/0174195 | A1* | 7/2013 | Witenstein-Weaver | H04N 21/4722 725/32 |

FOREIGN PATENT DOCUMENTS

| | | |
|---|---|---|
| EP | 2 320 648 A2 | 5/2011 |
| WO | WO 2012/014130 | 2/2012 |

OTHER PUBLICATIONS

Chinese Office Action for Application No. 2013101395047 dated May 20, 2016 (full Chinese text and full English language translation).

* cited by examiner

FIG. 6
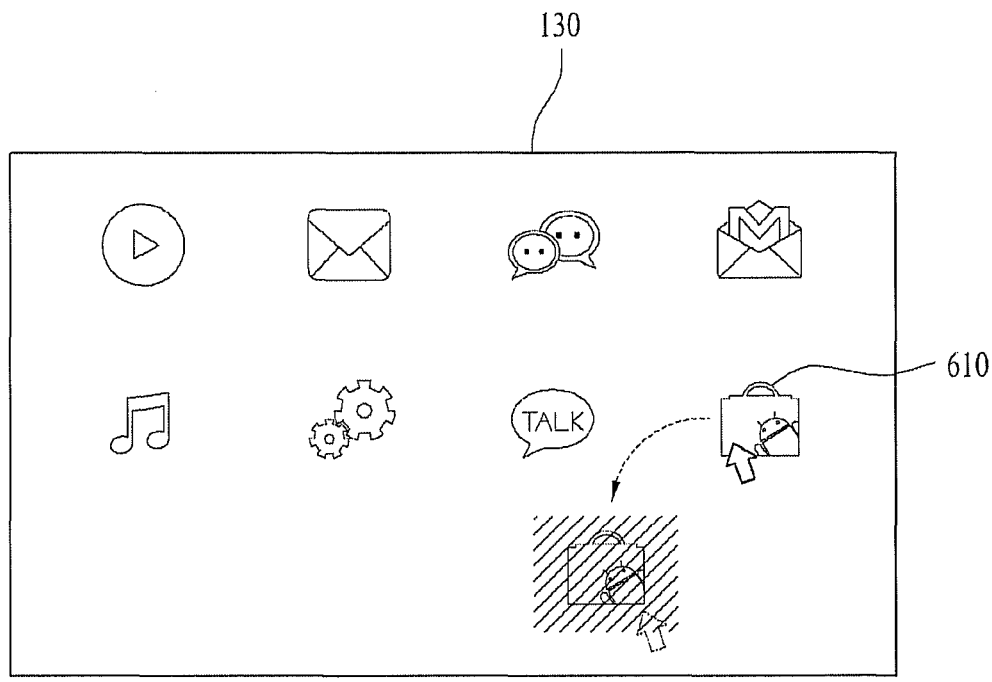
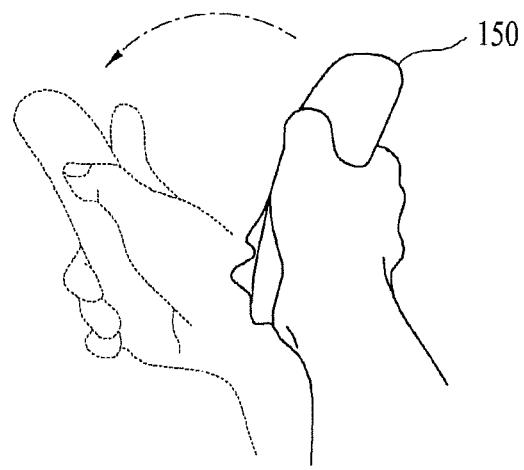

FIG. 7
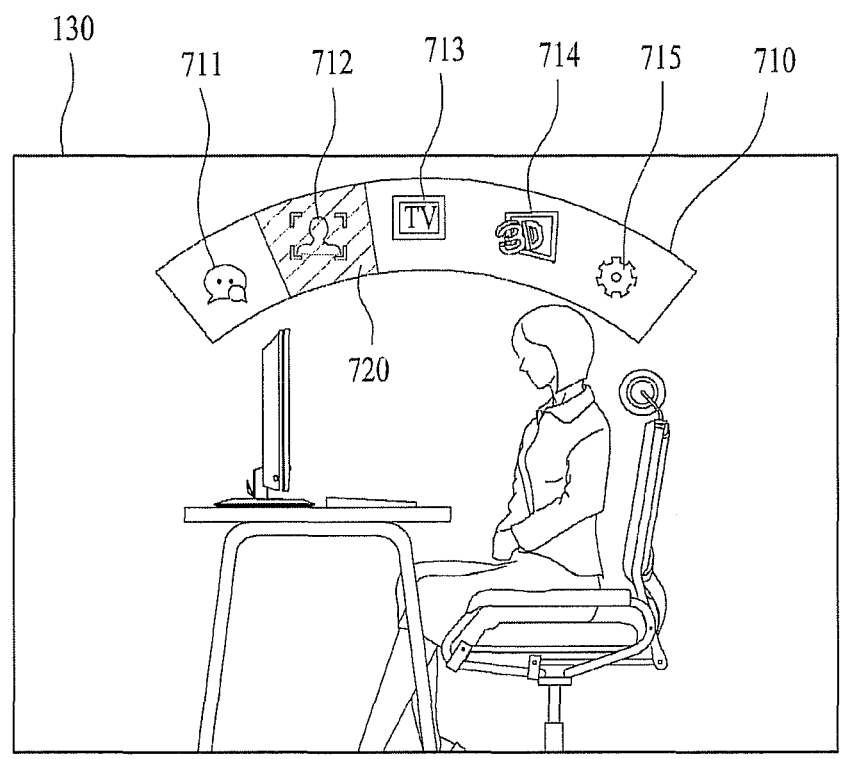
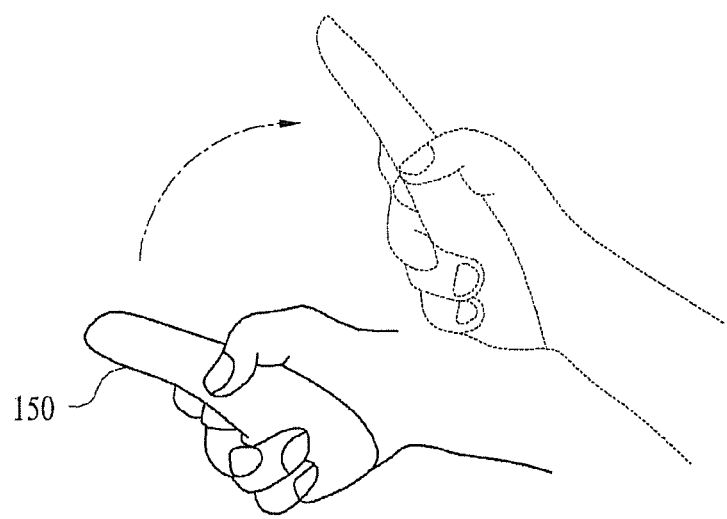

MEDIA SYSTEM AND METHOD OF PROVIDING RECOMMENDED SEARCH TERM CORRESPONDING TO AN IMAGE

Pursuant to 35 U.S.C. §119(a), this application claims the benefit of the Korean Patent Application No. 10-2012-0048151, filed on May 7, 2012, which is hereby incorporated by reference as if fully set forth herein.

BACKGROUND OF THE INVENTION

Field of the Invention

The present invention relates to a media system and a method of providing recommended search term(s) corresponding to an image and, more particularly, to a media system and a method of providing recommended search term(s) corresponding to an image that can provide recommended search term(s) corresponding to an image being displayed on a display screen.

Discussion of the Related Art

As diverse types of multimedia devices have become common, a remote controlling device, which is configured to easily operate a particular multimedia device from a distant range, has been widely used due to its price to convenience ratio. However, with the outstanding supply of multimedia devices, each having a larger display screen and more complicated functions, the manipulation of remote controlling devices have become more complicated and difficult.

For example, when the user wishes to change the color of the display screen through his (or her) TV, the user is required to execute a wanted menu by pressing on a specific button on the remote controlling device. Then, the user selects a wanted menu by pressing on directions keys provided on the remote controlling device. Thereafter, the user adjusts the corresponding values from the corresponding sub menu. Then, the user is required to manipulate the remote controlling device once again by pressing on a specific button, so as to return to the higher layer menu. Finally, the user is required to press on a specific button of the remote controlling device, so as to end the adjustment process and to close the menu screen. This process required a complicated series of manipulations.

Meanwhile, as diverse functions are integrated in the remote controlling device, which is configured in a limited size, the types and number of control button provided on the remote controlling device have increased, thereby causing the manipulation of the remote controlling device to be more complicated and causing difficulty in accurately remembering all of the provided functions. In some cases, multiple functions may be selectively used by pressing on a single button, which causes inconvenience and difficulty for the user to accurately execute the function he (or she) wishes to perform. Furthermore, in case the number of control buttons provided on the remote controlling device increases, diverse manipulations may be performed. However, such a remote controlling device may perform diverse functions and operations. However, in order to accommodate all of the control buttons assigned for each of the diverse functions, the size of the remote controlling device inevitably becomes larger, difficult to manage, and its fabrication cost may also increase. Thus, discussions on a new type of inputting means are being made in order to overcome such difficulty and inconvenience.

Meanwhile, as diverse Video On Demand (VOD) systems enabling users to choose and view only wanted channels among a wide range of channels, multimedia reproducing devices being connected to display devices so as to reproduce multimedia contents, and Internet Protocol TeleVisions (IPTVs) that can acquire and exchange information to and from one another by being connected to the interne are being widely provided, it is becoming more difficult to make efficient use of the services providing diverse functions by using a simple remote controlling device. Accordingly, alternative methods of using wireless keyboards or wireless (or optical) mice are being proposed and applied. However, in light of cost efficiency, mobility, and convenience in usage, it is apparent that no other device can fully replace the efficiency provided by remote controlling devices.

Therefore, in order to resolve the above-described disadvantages, extensive research for adopting diverse types of wireless pointing devices and user interfaces in computers or other types of display devices is under progress.

SUMMARY OF THE INVENTION

Accordingly, the present invention is directed to a media system and a method of providing recommended search term corresponding to an image that substantially obviate one or more problems due to limitations and disadvantages of the related art.

An object of the present invention is to provide a media system and a method of providing recommended search term corresponding to an image that can allow a user to easily search for information related to an image, which is included in an image being displayed on a display screen.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for providing recommended search term corresponding to an image by using a display device, the method includes receiving a drag signal indicating that an image or a portion of the image has been dragged to a search window provided on a display screen, the image being included in a content displayed on the display screen of the display device and displaying one or more search terms related to the image or the portion of the image on the search window as the recommended search term based upon the received drag signal.

The method for providing recommended search term corresponding to an image further includes, detecting a user action requesting for a search mode to be activated as a display mode when the content is being displayed and displaying the search window and one of multiple image frames included in the displayed content as a still image on the display screen.

The still image may correspond to an image frame being displayed at a time point when the content is stopped.

The display screen may be displayed as a Picture In Picture (PIP), and a primary screen of the display screen may display a still image screen of the displayed content, and a secondary screen of the display screen may continue to display the corresponding content.

An image selection mark for selecting the image or a portion of the image may be displayed on the display screen, and a guidance note related to the image and a portion of the image may be displayed on the display screen.

The step of displaying one or more search terms related to the image or the portion of the image on the search window as recommended search term may include displaying a deletion icon for deleting the recommended search term displayed on the search window.

The method for providing recommended search term corresponding to an image may further include detecting a user action of selecting the deletion icon, and, in response to the detected user action, removing the recommended search term related to the selected deletion icon from the search window.

The method for providing recommended search term corresponding to an image may further include detecting a user action requesting for a search process, and, in response to the detected user action, performing the requested search process based upon the recommended search term displayed on the search window.

The displayed content may include at least one of a web page, an application, a broadcast program, a video, a picture, and an image. And, the displayed content may include at least one of a content being stored in a local storage section of the display device, a real-time broadcast program, a content being transmitted via streaming, a downloaded content, and a content filmed (or recorded) by a camera included in the display device.

According to another aspect of the present invention, an electronic device connected to a display device and a remote controlling device, so as to display content. Herein, the electronic device may include a receiving unit configured to receive content and a control signal corresponding to a user action from the remote controlling device and a controller configured to display the received content to the display unit, display a search window on a display screen based on the received control signal, display one or more search terms related to an image or a portion of the image of the content as a recommended search term on the search window when the image or the portion of the image of the content has been dragged to the displayed search window. The image is included in a still image of the content.

The electronic device may further include a remote controlling device. And, the image or the portion of the image may move with respect to movements of the remote controlling device.

According to another aspect of the present invention, in a method for providing recommended search term corresponding to an image by using a display device, the method may include displaying a content on a display screen of the display device, and, in response to a user action requesting for a search mode to be activated as a display mode, displaying a search window and one of multiple image frames included in the displayed content as a still image on the display screen. Herein, the search window may display a guidance word or guidance note respective to each of the multiple images or portions of a corresponding image as multiple recommended search terms, wherein the image may be included in the displayed still image.

According to a further aspect of the present invention, in a method for providing recommended search term corresponding to an image by using a display device, the method may include displaying a content on a display screen of the display device, detecting a user action requesting for a search mode to be activated as a display mode, in response to the detected user action, displaying a search window and one of multiple image frames included in the displayed content as a still image on the display screen, and displaying an image selection mark for selecting an image or a portion of the image, wherein the image may be included in the still image, detecting a user action of selecting the displayed image selection mark, and, in response to the detected user action, displaying multiple search terms related to an image or a portion of the image as recommended search term on the search window, wherein the image may be indicated by the selected image selection mark.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 illustrates movements of a graphic object with respect to movements of the remote controlling device;

FIG. 7 illustrates a display of a menu with respect to movements of the remote controlling device;

DETAILED DESCRIPTION OF THE INVENTION

Reference will now be made in detail to the preferred embodiments of the present invention, examples of which are illustrated in the accompanying drawings. However, the embodiment of the present invention described below may be modified to a wide range of modifications. And, therefore, it should be understood that the present invention will not be limited only to the example presented in the description of the present invention set forth herein.

Although the terms used in the present invention are selected from generally known and used terms, the terms used herein may be varied or modified in accordance with the intentions or practice of anyone skilled in the art, or along with the advent of a new technology. Alternatively, in some particular cases, some of the terms mentioned in the description of the present invention may be selected by the applicant at his or her discretion, the detailed meanings of which are described in relevant parts of the description herein. Furthermore, it is required that the present invention is understood not simply by the actual terms used but by the meaning of each term lying within.

Hereinafter, "term" in the disclosure can be defined or replaced a term comprising at least one of "word(s)", "phrase(s)", "sentence(s)" and "statement(s)".

Figure 1:
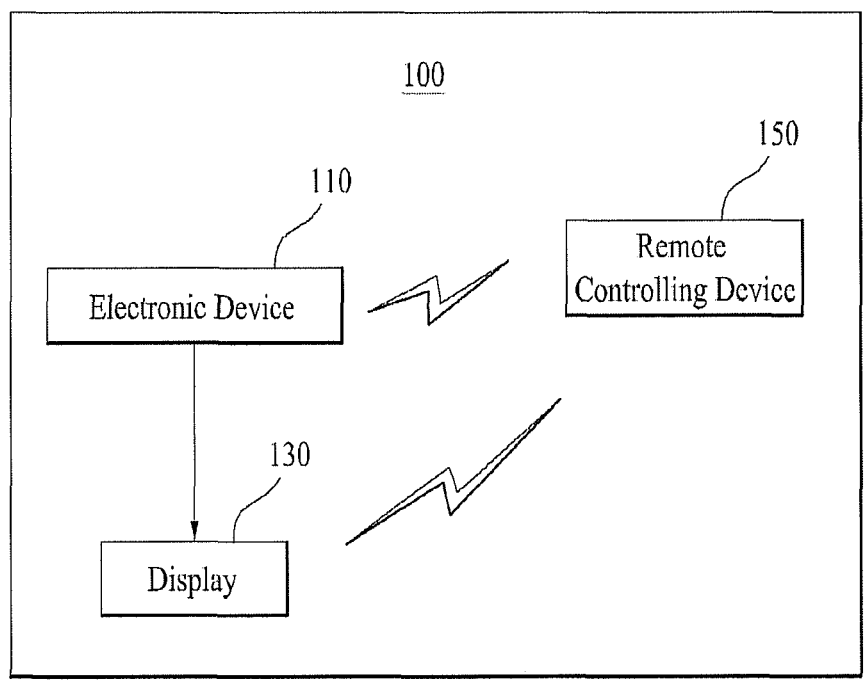
FIG. 1 illustrates a block diagram showing the structure of a media system.

FIG. 1 illustrates a block diagram showing the structure of a media system.

Referring to FIG. 1, a media system 100 may include at least one of an electronic device 110, a display device 130, and a remote controlling device 150. Herein, the media system 100 and/or electronic device 110 may correspond to a standing device, such as a digital television (DTV), a personal computer (PC), and a mobile device such as a laptop computer, a tablet PC, a smart phone and the like, and may also correspond to a display device.

The media system 100 may be operated in accordance with a display method of the contents, a size, shape, position, movement or color of the area (or section) in which the contents are being displayed, or a display mode determining whether or not the corresponding display area (or section) is being highlighted. The display mode of the media system 100 may include at least one of a normal mode and a search mode.

The normal mode refers to a general display mode. The normal mode corresponds to a display mode that is maintained before any user action (or motion) (hereinafter referred to as 'action') is detected, after the media system 100 has been booted. The normal mode may include a full screen mode according to which the contents are displayed throughout the entire screen. More specifically, in the normal mode, when a specific content is being displayed, the corresponding content may be displayed in the full screen mode.

The search mode refers to a display mode having a search window displayed on the display screen. In the search mode, the user may perform a search process by using the recommended search term displayed on the search window.

The electronic device 110 and the display device 130 may be fabricated and sold as a single product, or the electronic device 110 and the display device 130 may each be fabricated and sold as separate products. Herein, the electronic device 110 may correspond to mobile user equipments (or terminals), such as mobile phones, smart phones, digital broadcasting terminals, Personal Digital Assistants (PDAs), Portable Multimedia Player (PMP), navigators, and so on. And, the electronic device 110 may also correspond to fixed electric appliances, such as set-top boxes or digital television (TV) receivers. Additionally, an integrated product consisting of the electronic device 110 and the display device 130 will be referred to as a display device in the disclosure of the present invention.

The electronic device 110 may correspond to a multimedia device that can reproduce (or play-back) multimedia data stored in a storage medium, and the electronic device 110 may also correspond to a broadcast receiver that can receive broadcast signals and decode multimedia data that are included in the received broadcast signals. Herein, the multimedia data may include two (2)-dimensional images as well as three (3)-dimensional (or stereoscopic) images. Additionally, the 3D (or stereoscopic) image may correspond to multi-perspective image. Herein, a multi-perspective image refers to an image consisting of multiple images acquired by filming (or recording) the same object through multiple cameras each positioned at different angles and different distances. And, each image acquired from each camera may be defined as a perspective image.

The broadcast receiver may correspond to a broadcast receiver that can receive broadcast signals being transmitted via terrestrial, satellite, and cable broadcasting and broadcast signals being transmitted through the internet. Additionally, the broadcast receiver may correspond to a broadcast receiver that can provide internet services to viewers (or users). Herein, an Internet service may include Contents on Demand (COD) services, YouTube services, information services, such as weather forecast, news, local information, web search, and so on, entertainment services, such as games, karaoke, and so on, communication services, such as TV mailing, TV Short Message Service (SMS), and so on, which can all be provided through the internet. Accordingly, in the disclosure of the present invention, the broadcast receiver may include a network TV, a web TV, and a broadband TV. Furthermore, the broadcast receiver may also correspond to a smart TV that can receive an application from a server through the network and that can install the received application.

The electronic device 110 may perform a pairing process for performing wireless (or radio) communication with the remote controlling device 150. When the electronic device 150 receives an RF signal requesting for a pairing process from the remote controlling device 150, the electronic device 110 may respond to the RF signal reception and generate identification information. And, then, the electronic device 150 may transmit the generated identification information to the remote controlling device 150.

The remote controlling device 150 may transmit an RF signal requesting for a pairing process to the electronic device 110 and may also receive an RF signal notifying the identification information from the electronic device 110. Additionally, the remote controlling device 150 may store the identification information. The remote controlling device 150 may transmit a control signal and an RF signal including the stored identification information to the electronic device 110. The electronic device 110 may compare the identification information included in the RF signal with the stored identification information. Then, based upon the compared result, the electronic device 110 may exclude the received RF signal or may input the received RF signal.

The display device 130 displays contents. The display device 130 may receive directions from the electronic device 110 to display the corresponding contents. And, the display device 130 may also receive a transmission outputted from the remote controlling device 150 and may display contents in accordance with the information included in the received transmission. The contents being displayed by the display device 130 may include at least one of a web page, an application, a broadcast program, a video, a picture, an image, and an icon. Additionally, the contents being displayed by the display device 130 may also include at least one of a content being stored in a local storage section of the electronic device 110, a real-time broadcast program, a content being transmitted via streaming, a downloaded content, and a content filmed (or recorded) by a camera included in the media system.

Moreover, an image being displayed by the display device 130 may correspond to a 2D image, a dual perspective (or stereoscopic) image or a multiple perspective image, or a hologram.

Furthermore, the display device may be connected to the electronic device so as to be operated in connection with the electronic device. The display device 130 may display a graphical user interface (GUI) or user interface (UI), which provides an interface that is easy to use between a user of the electronic device and an operating system (OS) or an application being executed within the operating system.

Figure 2:
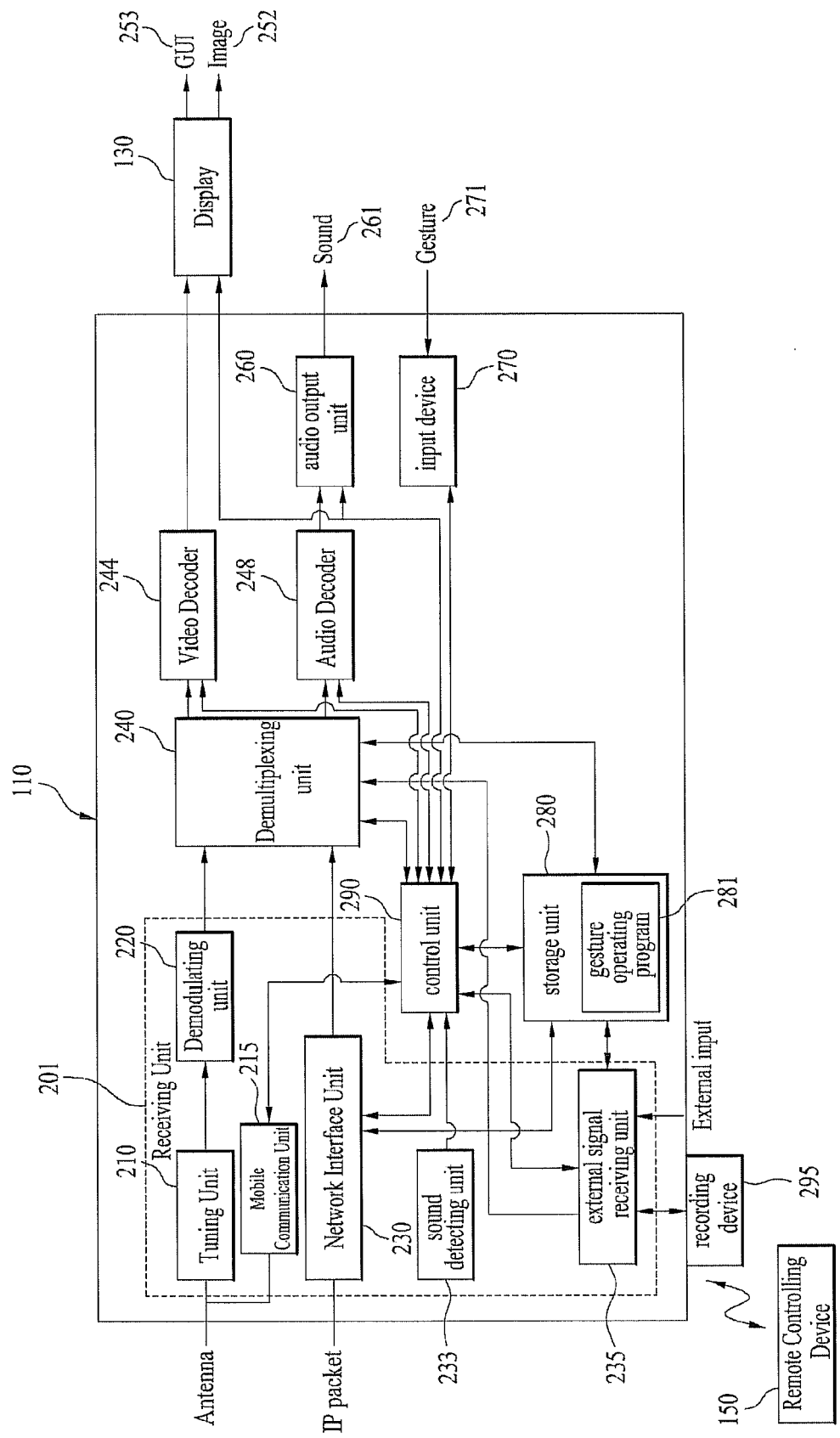
FIG. 2 illustrates a block diagram showing the structure of an electronic device.

FIG. 2 illustrates a block diagram showing the structure of an electronic device.

Referring to FIG. 2, the electronic device 110 may include at least one of a receiving unit 201, a demultiplexing unit 240, a video decoder 244, an audio decoder 248, an audio output unit 260, an input device 270, a storage unit 280, and a control unit 290. Here, the electronic device 110 may further include a recording device 295. Additionally, the electronic device 110 may further include a display device 130.

The receiving unit 201 may receive broadcast data, image data (or video data), sound data (or audio data), information data, and application data. The image data may correspond to image data for displaying 2D images and image data for displaying 3D images. Additionally, the 3D image may include at least one of a hologram and a stereoscopic image. The hologram may correspond to a Computer-Generated Hologram (CGH).

The receiving unit 201 may include a tuning unit 210, a demodulating unit 220, a mobile communication unit 215, a network interface unit 230, a sound detecting unit 233, and an external signal receiving unit 235. The tuning unit 210 may receive a stream signal including data through a broadcast network, and the demodulating unit 220 may demodulate the received stream signal. The tuning unit 210 may include 2 tuners. Herein, one tuner receives a real-time broadcast program of a channel that is currently being displayed. And, the other tuner continues to switch channels, so as to receive real-time broadcast programs of each channel. The control unit 290 uses the received real-time broadcast programs so as to generate still images or thumbnail images, and, then, the control unit 290 performs control operations so that the generated images can be stored in the storage unit 280.

The mobile communication unit 215 may receive data through a mobile communication network, such as a 2G communication network, a 3G communication network, a 4G communication network, and so on. Additionally, the network interface 230 may transmit and receive IP packets through the network. The external signal receiving unit 235 may receive applications and contents from external devices, and the external signal receiving unit 235 may also receive an image frame from the recording device 295. Herein, the image frame may correspond to an image frame recorded by the user.

The demultiplexing unit 240 demultiplexes a stream signal outputted from the demodulating unit 220 to a video signal and an audio signal. Additionally, the demultiplexing unit 240 may receive broadcast data, image data (or video data), sound data (or audio data), information data, and application data from the mobile communication unit 215, the network interface unit 230, and the external signal receiving unit 235.

The video decoder 244 decodes a video signal, which is demultiplexed by the demultiplexing unit 240. And, then, the video decoder 244 outputs the decoded video signal to the display device 130.

The audio decoder 248 decodes an audio signal, which is demultiplexed by the demultiplexing unit 240. And, then, the audio decoder 248 outputs the decoded audio signal to the audio output unit 260.

The audio output unit 260 may receive sound data (or audio data) from the audio decoder 248 and the control unit 290, and, then, the audio output unit 260 may output a sound 261 corresponding to the reproduction (or playback) of the received sound (or audio) data.

The input device 270 may correspond to a touch-screen positioned over the display device 130 or in front of the display device 130, and the input device 270 may also correspond to a communication unit receiving signals from the remote controlling device 150. The input device 270 may receive transmissions from the remote controlling device 150.

And, the receiving unit 201 may correspond to a communication unit receiving signals from the remote controlling device 150. More specifically, the external signal receiving unit 235 may receive transmissions from the remote controlling device 150.

The storage unit 280 provides a space for storing program codes and data, which are used by the electronic device 110. Herein, a program code may correspond to a program code of an application, which is received by the receiving unit 201, and may also correspond to a program code of an application, which is stored in the electronic device 110 at the time of its fabrication. Additionally, an application may be written in a programming language, such as HTML, XML, HTML5, CSS, CSS3, JavaScript, Java, C Language, C++, Visual C++, C#, and so on. The storage unit 280 may store still images or thumbnail images respective to channels of the real-time broadcast programs that are being on the air. The stored still images or thumbnail images may be updated to still images or thumbnail images, which are generated by using the real-time broadcast program being aired by the corresponding channel.

The storage unit 280 may be configured as a Read-Only Memory (ROM), a Random Access Memory (RAM), a Hard Disk Drive (HDD), and so on. The program code and data may exist in a detachable (or separate type) storage medium. And, whenever required, detachable storage medium may be loaded or installed to the electronic device 110. Herein, the detachable storage medium may include CD-ROMs, PC-CARDs, memory cards, floppy disks, magnetic tapes, and network components.

The control unit 290 executes a command (or command term) and performs the operations associated with the electronic device 110. For example, the control unit 290 may use the command searched by the storage unit 280, so as to control the input and output between the components of the electronic device 110 and to control the reception and processing of data. The control unit 290 may execute the command associated with the information included in the transmission, which is received from the remote controlling device 150.

The control unit 290 performs the operations of executing the program code along with the operating system and generating and using data. The operating system is generally disclosed. And, therefore, detailed description of the same will be omitted for simplicity. For example, the operating system may correspond to a Windows group OS, Unix, Linux, Palm OS, DOS, Android, Macintosh, and so on. The operating system, other computer codes, and data may exist in the storage unit 280, which operates in connection with the control unit 290.

The control unit 290 may be configured as a single chip or multiple chips, or may be built in diverse electrical assembly parts. For example, diverse architectures including dedicated or embedded processors, single-purpose processors, controllers, ASICs, and so on, may be used with respect to the control unit 290.

The control unit 290 may recognize a User Action and may control the electronic device 110 based upon the recognized user action. Herein, the user action may include the selection of a physical button from the electronic device or the remote control device, the execution of a predetermined gesture over a display surface of the touch-screen, the selection of a soft button, the execution of a predetermined gesture being recognized from an image, which is recorded (or filmed or taken) by the recording device 295, and the execution of a predetermined voice emission being recognized by voice recognition. Herein, a gesture may include a touch gesture and a spatial gesture.

Additionally, the control unit may verify a user action, which is detected (or sensed) by the remote controlling device 150 based upon information included in a transmission, which is received from the remote controlling device 150. Thereafter, based upon the verified user action, the control unit 290 may control the electronic device 110 or the display device 130.

When the remote controlling device 150 has detected a user action requesting for the display mode to be switched to the search mode, the control unit 290 may control the electronic device 110, so that the electronic device 290 can be operated in the search mode.

In the search mode, when a user action selecting an image being included in the content that is currently being displayed is detected, or when a user action selecting a portion of the corresponding image is detected, the control unit 290 responds to the detection of the corresponding user action. Thereafter, the control unit 290 may provide a graphic feedback indicating that the corresponding image or a portion of the corresponding image has been selected. Additionally, in accordance with the movement of the remote controlling device 150, the control unit 290 may drag the selected image or the selected portion of the corresponding image.

Moreover, the control unit 290 may verify whether or not the selected image included in the content that is being displayed on the display device 130, or the selected portion of the corresponding image, has been dragged to the search window, which is displayed on the display device 130. When the corresponding image or the portion of the corresponding image is dragged to the search window, the control unit 290 displays multiple search terms, which are related to the corresponding image or portion of the corresponding image, on the search window as the respective recommended search term.

The control unit 290 may perform control operations enabling a transmission, which directs the display device 130 to display an image 252 or a GUI 253, to be transmitted.

The input device 270 receives a gesture 271, and the control unit 290 executes commands, which perform operations related to the received gesture 271. Moreover, the storage unit 280 may include a gesture operating program 281, which may correspond to a portion of the operating system or to a portion of a separate application. The gesture operating program 281 may generally recognize the generation of the gesture 271. And, the gesture operating program 281 may include a series of command terms notifying at least one or more software agents of the recognized gesture 271 or of at least one or more specific actions that is to be performed in response to the recognized gesture 271.

Figure 3:
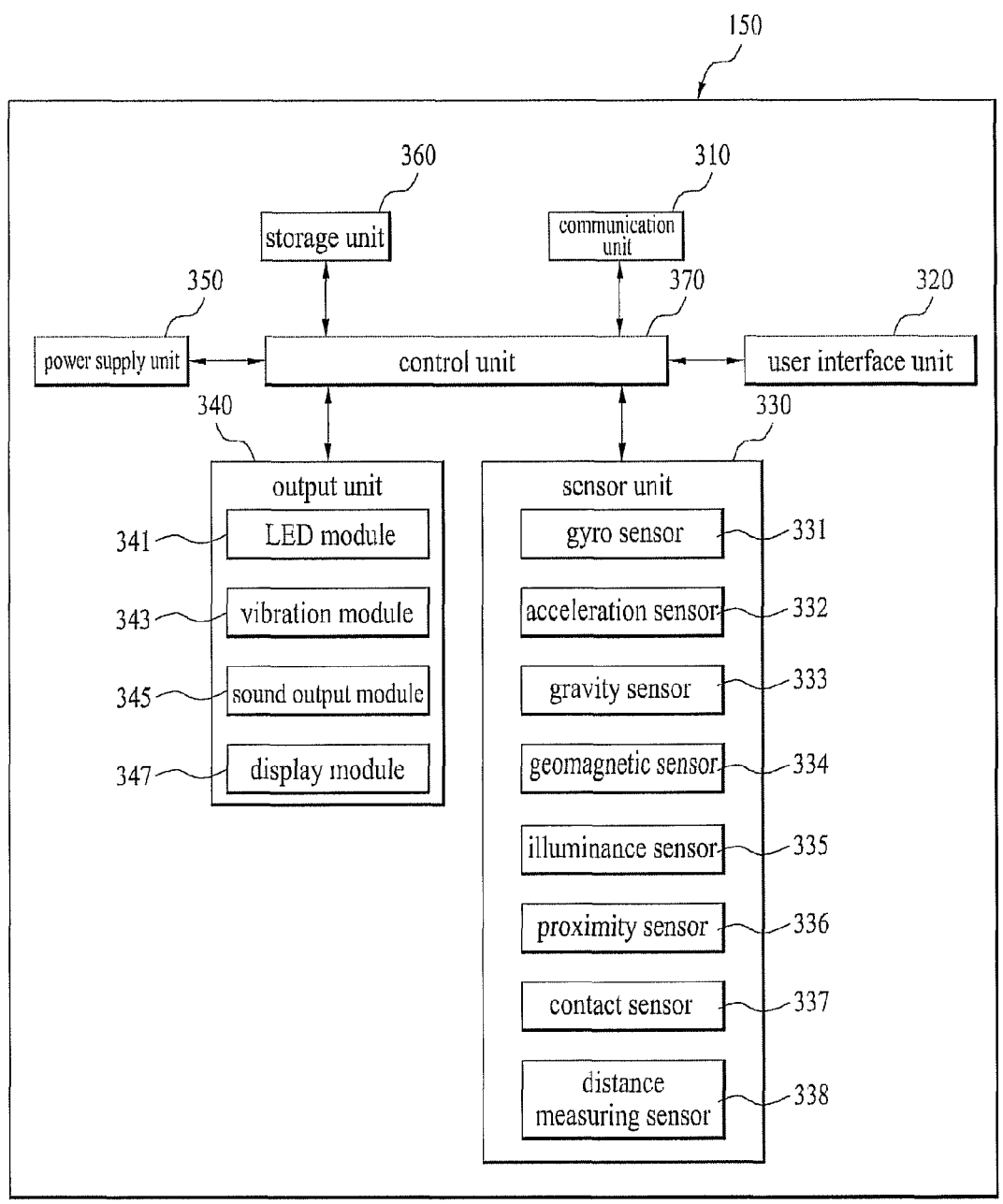
FIG. 3 illustrates a block diagram showing the structure of a remote controlling device.

FIG. 3 illustrates a block diagram showing the structure of a remote controlling device.

Referring to FIG. 3, the remote controlling device 150 may include at least one of a communication unit 310, a user interface unit 320, a sensor unit 330, an output unit 340, a power supply unit 350, a storage unit 360, a control unit 370, and a light emitting unit 380.

The communication unit 310 corresponds to a communication mode providing a two-way non-directional (or omni-directional) communication means. The communication unit 310 may perform wireless (or radio) communication with the electronic device 110 by using a communication method respective to a predetermined communication standard. Herein, the communication standard may correspond to any one of ZigBee, Bluetooth, Ultra WideBand (UWB), Radio Frequency Identification (RFID), Wireless LAN (or Wi-Fi), and so on. The communication unit 310 may transmit a control signal to the electronic device 110. Herein, the control signal may correspond to a signal carrying information related to the movements of the remote controlling device 150, and the control signal may also correspond to a signal indicating a command that is to be executed by the electronic device 110. Additionally, the control signal may include a control signal corresponding to a detected user action. Also, the control signal may be generated based upon a specific location on the user interface unit 320 where a contact has been detected and also based upon a control mode. Herein, the user action may include the selection of a physical button on the remote controlling device, the movement of the remote controlling device, the execution of a predetermined touch gesture performed on an interface provided by the user interface unit 320, and the selection of a soft button.

The control unit 370 may control overall operations related to the control the remote controlling device 150. The control unit 370 may control the communication unit 310, so that an RF signal including a control signal can be transmitted. Additionally, the control unit 370 may control the communication unit 310, so that the communication unit 310 can receive the signal transmitted from the electronic device 110.

The control unit 370 receives a sensor signal from the sensor unit 330. The sensor signal is generated based upon at least one of the position, direction, movement, and contact of the remote controlling device 150.

The control unit 370 may receive a sensor signal, which indicates the movement of the remote controlling device 150, from the sensor unit 330. And, the control unit 370 may also receive a user action from the user interface unit 320. Additionally, the control unit 370 may generate a data packet including information respective to the movement indicated by the receive sensor signal and a control signal related to the received user action. And, then, the control unit 370 may perform control operations enabling the generate data packet to the transmitted to the electronic device 110.

The user interface unit 320 provides an interface for controlling the electronic device 110 or the display device 130. And, the user interface unit 320 senses a user action, which is performed on the provided interface. The user interface unit 320 may be configured of a keypad, a button, a touchpad, or a touch-screen. The user may manipulate the user interface unit 320, so as to input a command for controlling the electronic device 110 or display device 130 to the remote controlling device 150.

The user interface unit 320 includes a first button and a second button each being positioned at different surfaces. And, the user interface unit 320 may detect a user action respective to at least one of the first button and the second button. According to a portion of the embodiment of the present invention, the first button may be located on a rear surface of the remote controlling device 150, and the second button may be located on a front surface of the remote controlling device 150. Additionally, other buttons may not be located on the surface where the first button is located, and other buttons may be located on the surface where the second button is located. Hereinafter, the first button will be referred to as a GRAB button, and the second button will be referred to as an OKAY button.

The GRAB button may be used for the purpose of grabbing or touching a display screen of the display device 130 or may be used for the purpose of grabbing or touching a graphic object, which is displayed on the display screen of the display device 130. For example, when the user presses the GRAB button, the electronic device 110 or the display device 130 may determine that the user has touched the display screen of the display device 130 and may respond accordingly, thereby providing a respective feedback. The provided feedback may correspond to a feedback that can be recognized by at least any one of time, auditory sense, and tactile sense.

The OKAY button may be used for the purpose of selecting a graphical object or a menu item on which a graphical pointer is located within the display screen of the display device 130. Herein, the graphical pointer may be referred to as a pointer.

In selecting the graphical object, the difference between the GRAB button and the OKAY button is that the GRAB button selects a specific graphical object regardless of the location of the graphical pointer, and that the OKAY button selects a graphical object in accordance with the location of the graphical pointer.

The control unit 370 responds to the user action of pressing on the GRAB button and generates a down signal of the GRAB button. And, the control unit 370 responds to the user action pressing on the OKAY button and generates a down signal of the OKAY button. Additionally, the control unit 370 responds to the user action of releasing the GRAB button and generates an up signal of the GRAB button. And, the control unit 370 responds to the user action releasing the OKAY button and generates an up signal of the OKAY button. The control unit 370 may perform control operations enabling the generated down signal and up signal of the GRAB button and the generated down signal and up signal of the OKAY button to be transmitted to the electronic device 110 or the display device 130. Herein, the down signal and up signal of the GRAB button and the down signal and up signal of the OKAY button may be simultaneously transmitted or may be separately transmitted. Furthermore, the down signal and up signal of the GRAB button and the down signal and up signal of the OKAY button may be transmitted at the same time as the movement information of the remote controlling device 150 or may be transmitted separately from the movement information of the remote controlling device 150.

The sensory unit 330 generates a sensor signal based upon at least one of a location, direction, movement, and contact (or touch) of the remote controlling device 150. The sensor unit 330 may include at least one of a gyro sensor 331, an acceleration sensor 332, a gravity sensor 333, a geomagnetic sensor 334, an illuminance sensor 335, a proximity sensor 336, a contact sensor 337, and a distance measuring sensor 338.

The gyro sensor 331 may sense the movement of the remote controlling device 150 and may generate a sensor signal indicating the sensed movement. For example, the gyro sensor 331 may sense the movement of the remote controlling device 150 based upon x, y, and z axises and may generate a sensor signal indicating a space vector based upon the sensed result.

The acceleration sensor 332 may sense the movement speed of the remote controlling device 150 and may generate a sensor signal indicating the sensed movement speed.

The gravity sensor 333 may use the earth's gravity so as to sense the remote controlling device 150 from top to bottom. Then, the gravity sensor 333 may generate a sensor signal indicating the direction of the gravity sensor 333.

The geomagnetic sensor 334 may use the earth's geomagnetic force so as to sense the direction of the remote controlling device 150 and may generate a sensor signal indicating the sensed direction of the remote controlling device 150.

The illuminance sensor 335 may sense the illuminance surrounding the remote controlling device 150 and may generate a sensor signal indicating the sensed illuminance.

The proximity sensor 336 may sense an object approaching the remote controlling device 150 and may generate a sensor signal indicating the sensed result.

The contact sensor 337 may sense the contact of the remote controlling device 150 and may generate a sensor signal indicating the sensed result.

The distance measuring sensor 338 may sense the distance between the distance measuring sensor 338 and the electronic device 110 and may generate a sensor signal indicating the sensed distance.

The output unit 340 may output at least one of an image signal (or video signal), a sound signal (or audio signal), light, and haptic feedback, which either correspond to the user action sensed by the user interface unit 320 or correspond to the signal transmitted from the electronic device 110. The output unit 340 may be equipped with at least one of an LED module 341, which is turned on either when the user interface unit 320 is manipulated or when a signal is transmitted and received to and from the electronic device 110 through the communication unit 310, a vibration module 343, which generates vibration, a sound output module 345, which outputs sound, and a display module 347, which outputs images.

The power supply unit 350 supplies power to the remote controlling device 150. When the remote controlling device 150 does not move for a predetermined period of time, the power supply unit 350 stops the power supply, thereby preventing power from being wasted. The power supply unit 350 may continue supply power when a predetermined key provided on the remote controlling device 150 is manipulated.

The storage unit 360 may store various types of programs and program data that are required for controlling or operating the electronic device 110. The storage unit 360 may store control data corresponding to the user action. The control unit 370 may access the control data corresponding to the user action, which is detected by the user interface unit 320, from the storage unit 360, and the control unit 370 may also perform control operations so that a control signal including the accessed control data can be controlled.

Additionally, the storage unit 360 may store information related to a frequency band. The remote controlling device 150 may transmit and receive signals to and from the electronic device 110 through the frequency band, which is indicated by the stored information. The information on the frequency band may include information indicating a management frequency channel and information indicating a bearing frequency channel.

Figure 4:
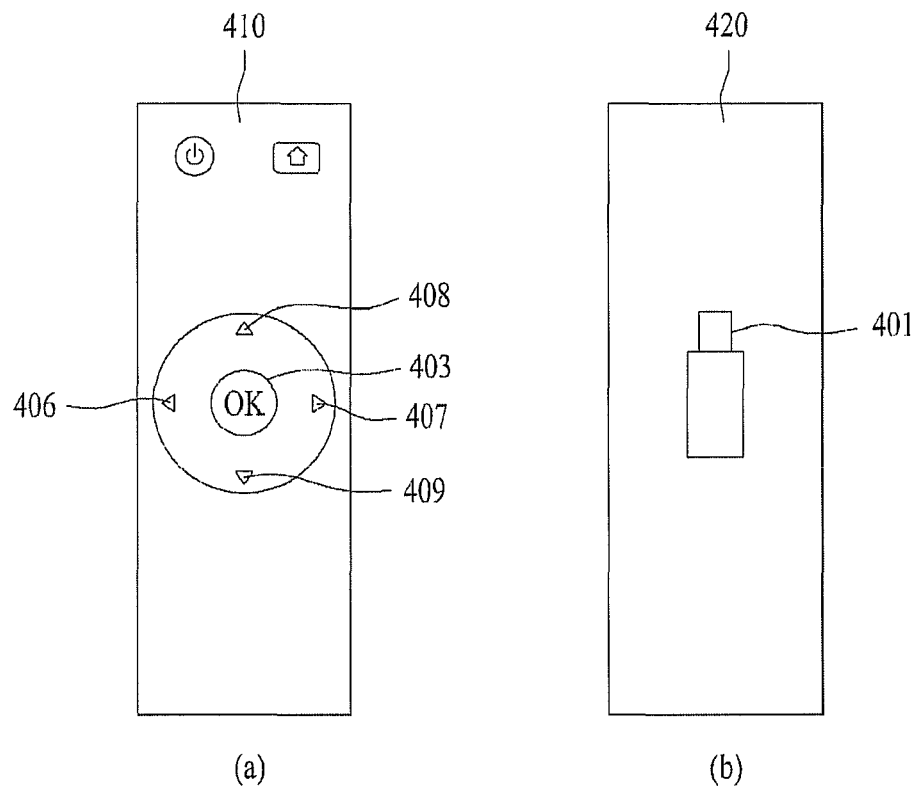
FIG. 4 illustrates an upper view, a bottom view, and a perspective view of a remote controlling device.

FIG. 4 illustrates an upper view, a bottom view, and a perspective view of a remote controlling device.

Here, (a) of FIG. 4 corresponds to the upper view of the remote controlling device 150, (b) of FIG. 4 corresponds to the bottom view of the remote controlling device 150, and (c) of FIG. 4 corresponds to the perspective view of the remote controlling device.

Referring to FIG. 4, the GRAB button 401 is located on a bottom surface (or rear surface) 420 of the remote controlling device 150, and the OKAY button 403 is located on an upper surface (or front surface) 410 of the remote controlling device 150. Accordingly, in the disclosure of the present invention, description will be provided so that the GRAB button 401 and the OKAY button 403 of the remote controlling device 150 can be easily pressed at the same time single-handedly by the user. Additionally, description will also be provided so that the user can easily move the remote controlling device 150 while pressing on both the GRAB button 401 and the OKAY button 403 at the same time.

Other buttons are not located on the bottom surface 420 of the remote controlling device 150 where the GRAB button 401 is located. And, other buttons 406, 407, 408, and 409 are located on the upper surface 410 of the remote controlling device 150 where the OKAY button 402 is located. Accordingly, the user may be capable of manipulating the GRAB button 401 by using his (or her) tactile senses without having to verify the location of the GRAB button 401 with his (or her) own eyes. Thus, in the disclosure of the present invention, description will be provided so that the user can easily manipulate the GRAB button 401 as well as the other buttons 406, 407, 408, and 409.

Figure 5:
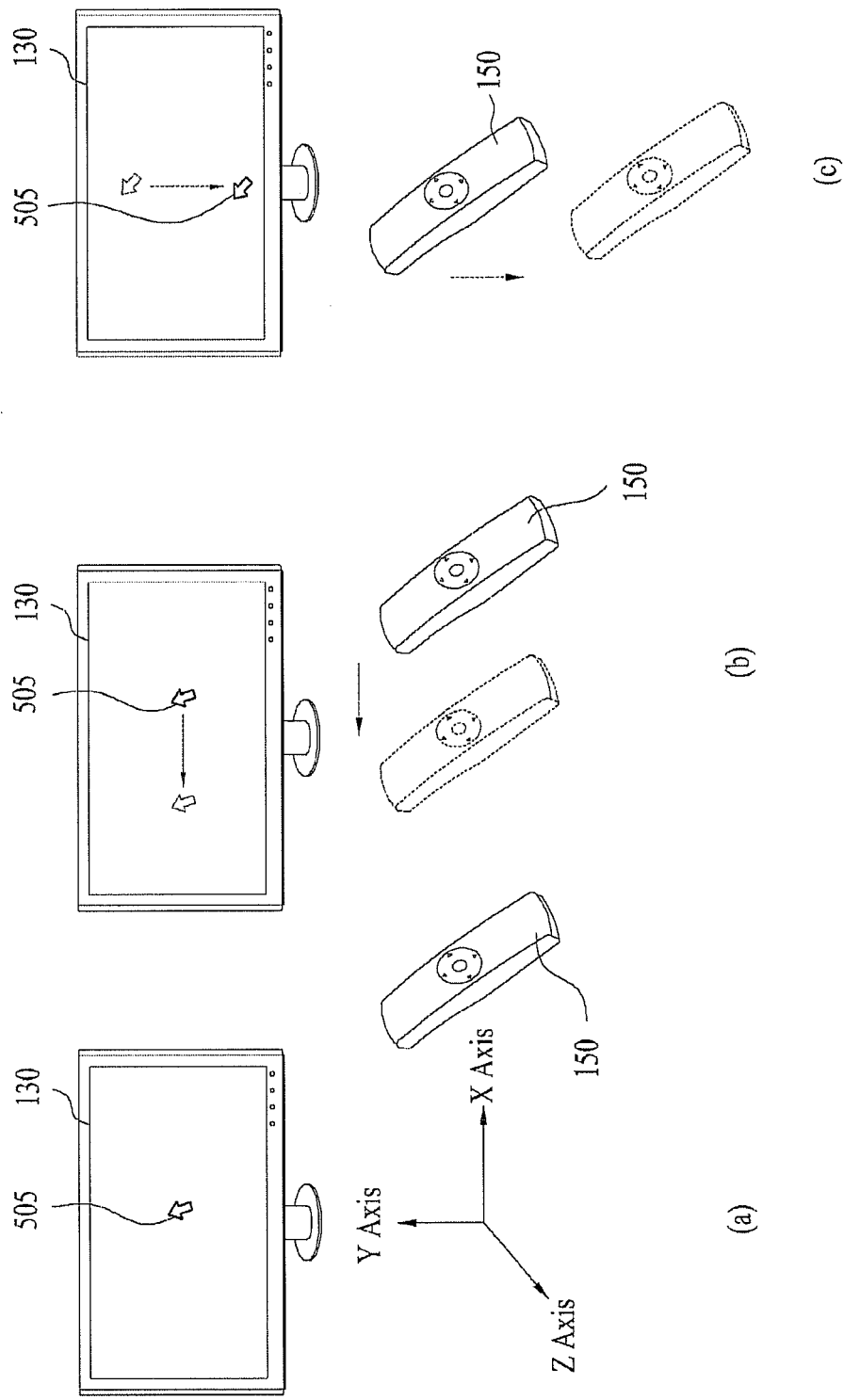
FIG. 5 illustrates movements of a cursor with respect to movements of the remote controlling device.

FIG. 5 illustrates a movement of a cursor with respect to movements of the remote controlling device.

Here, (a) of FIG. 5 shows an example of a display pointer 505 being displayed on the display device 130.

The user may perform user actions of moving the remote controlling device 150 vertically (or up and down), horizontally (or left and right) ((b) of FIG. 5), back and forth ((c) of FIG. 5) or rotating the remote controlling device 150. Hereinafter, in order to define the direction of the remote controlling device 150, an axis corresponding to a vertical axis of the display device 130 will be defined as the y axis, an axis corresponding to a horizontal axis of the display device 130 will be defined as the x axis, and an axis corresponding to a perpendicular axis of the display device 130 will be defined as the z axis. Herein, the vertical movements of the remote controlling device 150 will signify the movements along the y axis, the horizontal movements of the remote controlling device 150 will signify the movements along the x axis, and the back and forth movements of the remote controlling device 150 will signify the movements along the z axis.

The display pointer 505 being displayed on the display device 130 may be moved with respect to the movements of the remote controlling device 150. As shown in (a) of FIG. 5, since the display pointer 505 is moved in accordance with the movement of the remote controlling device 150, thereby being displayed on the display device 130, the remote controlling device 150 may also be referred to as a spatial remote controller or a magic remote controller. The display pointer 505 may be moved without requiring another button on the remote controlling device 150 to be pressed. According to a portion of the embodiment of the present invention, when the GRAB button and the OKAY button of the remote controlling device 150 are not pressed, the display pointer 505 may be move with respect to the movement of the remote controlling device 150.

And, (b) of FIG. 5 illustrates an example wherein, when the user moves the remote controlling device 150 leftwards, the display pointer 505 being displayed on the display device 130 is also moved leftwards with respect to the movement of the remote controlling device.

Movement information is transmitted to the electronic device. Herein, the movement information refers to information on the movement of the remote controlling device 150, which is detected by the sensor of the remote controlling device 150. The electronic device 110 may calculate coordinates of the display pointer 505 from the information on the movements of the remote controlling device 150. The electronic device 110 may perform control operations so that the display pointer 505 can be displayed on a specific position of the display device corresponding to the calculated coordinates.

Meanwhile, the movement speed or movement direction of the display pointer 505 may correspond to the movement speed or movement direction of the remote controlling device 150.

Meanwhile, the display pointer according to the disclosure of the present invention refers to an object being indicated on the display device 130 with respect to the movements of the remote controlling device 150. Accordingly, the display pointer 505 may be represented by an object having a variety of shapes other than the arrow shown in (b) of FIG. 5. For example, the object may include the concept of a spot (or point), a cursor, a prompt, bold borderlines, and so on. Additionally, the display pointer 505 may be displayed on the display device 130, so to correspond to a specific point along one of the horizontal axis and the vertical axis of the display device 130. And, the display pointer 505 may also be displayed on the display device 130, so as to correspond to multiple points, such as a line, a surface, and so on.

FIG. 6 illustrates another movement of a graphic object with respect to movements of the remote controlling device.

Referring to FIG. 6, when the display pointer is positioned over a graphical object 610, which is displayed on the display device 130, and when the user clicks on the OKAY button of the remote controlling device 150, the corresponding graphical object 610 may be selected.

Additionally, when the display pointer is positioned over a graphical object 610, which is displayed on the display device 130, and when the remote controlling device 150 is moved while the user is clicking on the OKAY button of the remote controlling device 150, the corresponding graphical object 610 may be moved with respect to the movement of the remote controlling device 150. According to a portion of the embodiment of the present invention, when the user presses on the OKAY button of the remote controlling device 150 without pressing on the GRAB button, the graphical object 610 may be moved with respect to the movement of the remote controlling device 150.

FIG. 7 illustrates a display of a menu with respect to movements of the remote controlling device.

Referring to FIG. 7, when the remote controlling device 150 is moved upwards along the y axis, while the GRAB button of the remote controlling device 150 is pressed, a menu 710 including multiple menu options (or items) 711, 712, 713, 714, and 715 may be displayed, and an indicator 720 for selecting the menu options 711, 712, 713, 714, and 715 may be further displayed on the display device 130.

The indicator 720 may be moved with respect to the movement of the remote controlling device 150. The user may move the indicator 720 in order to select the menu options 711, 712, 713, 714, and 715 included in the displayed menu 710. When the GRAB button of the remote controlling device 150 is released, among the menu options 711, 712, 713, 714, and 715, a specific menu option 712 over which the indicator 720 is located may be selected.

Figure 8:
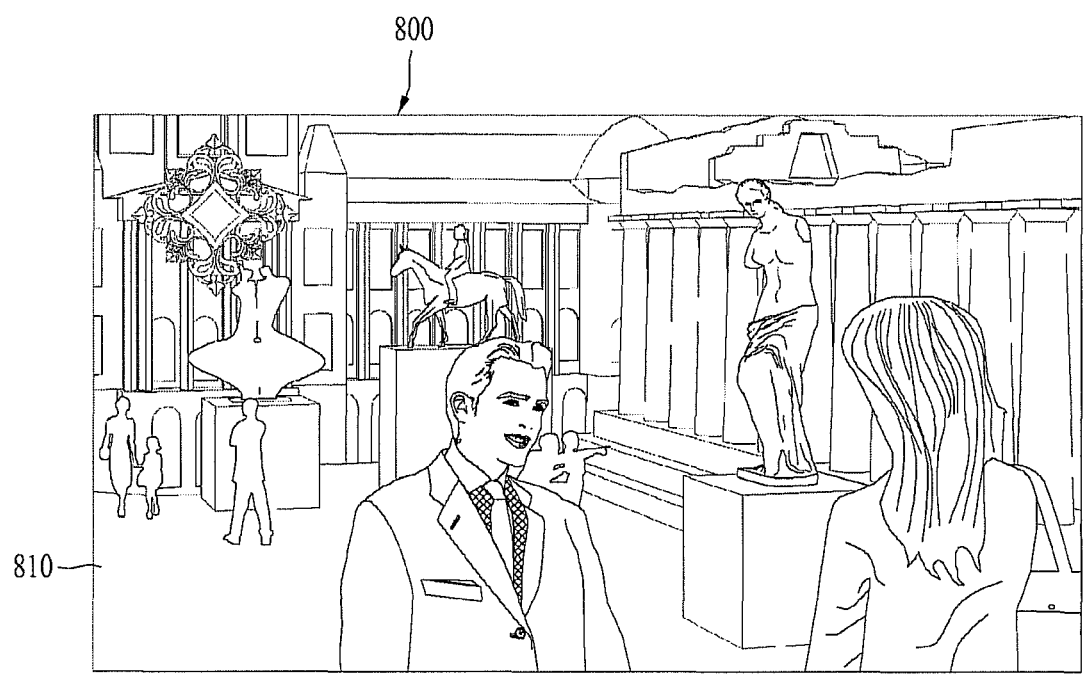
FIG. 8 illustrates contents being displayed on a display screen.

FIG. 8 illustrates contents being displayed on a display screen.

Referring to FIG. 8, the display device 130 may display a content 810 on the display screen 800. The electronic device 110 may direct the display device 130 to display the content, and the display device 130 may display the requested content in accordance with the directions of the electronic device 110.

The content displayed by the display device 130 may include at least one of a web page, an application, a broadcast program, a video, a picture, an image, and an icon. Additionally, the content displayed by the display device 130 may also include at least one of a content being stored in a local storage section of the electronic device 110, a real-time broadcast program, a content being transmitted via streaming, a downloaded content, and a content filmed (or recorded) by a camera included in the media system.

The real-time broadcast program may be received by the tuning unit 210 or the network interface unit 230 of the electronic device 110. Additionally, the real-time broadcast program 810 may correspond to a broadcast program being transmitted via groundwave (or terrestrial), satellite, and cable broadcasting and broadcast signals being transmitted through the internet.

Figure 9:
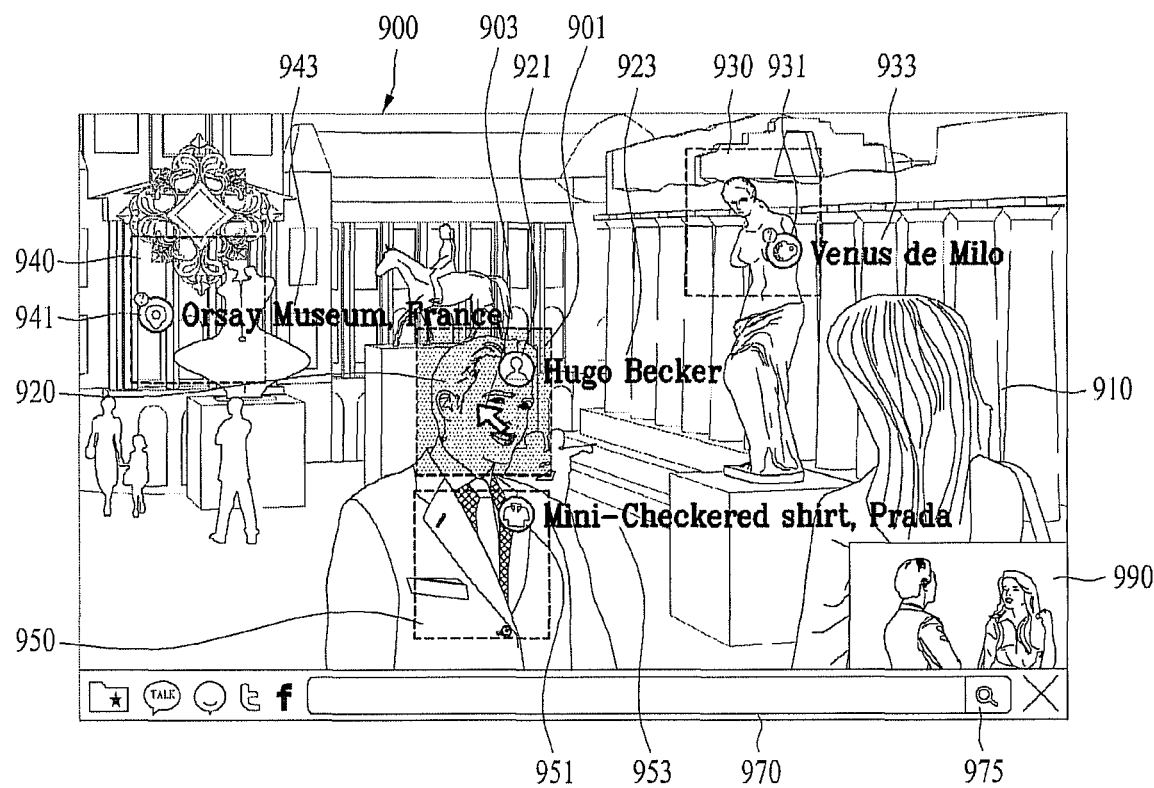
FIG. 9 illustrates a display screen being displayed in a search mode.

FIG. 9 illustrates a display screen being displayed in a search mode.

Referring to FIG. 9, the display screen 900 corresponds to a display screen where content is displayed in the search mode. Within the display screen 800 being displayed in FIG. 8, when a user action requesting for the search mode is detected, the media system 100 may be operated in the search mode in response to the detected user action. In the search mode, the electronic device 110 may transmit directions to the display device 130, so that the display of the current content 810 is stopped, and also so that an image frame 910 of the content is displayed as a still image screen.

Additionally, in the search mode, the display device 130 may stop displaying the current content 810 and may display the image frame 910 of the displayed content corresponding to the stopped time point as a still image screen. Herein, the image frame 910 may correspond to an image frame of the displayed content corresponding to the time point at which the display of the respective content has been stopped. The image frame 910 may also correspond to an image frame that has already been displayed a predetermined time period earlier than the stopped point. Conversely, the image frame 910 may also correspond to an image frame that is to be displayed a predetermined time period after the stopped point.

The display device 130 may display an image selection mark (or indication) for selecting an image or a portion of the image, which is included in the image frame being displayed in the search mode. The image selection mark 920, 930, 940, and 950 are provided in order to allow the user to select an image or a portion of the image being included in the image frame 910.

The display device 130 may display an indicator 901 for selecting the image selection mark 920, 930, 940, and 950 in the search mode. The indicator 901 may be relocated from the currently positioned image selection mark 920 to another image selection mark 930, 940, and 950 with respect to a pressed state of the direction key of the remote controlling device 150 or with respect to the movement of the remote controlling device 150. More specifically, the user may move (or relocate) the indicator 901 by pressing on the direction key of the remote controlling device 150, or the user may move (or relocate) the indicator 901 by moving the remote controlling device 150.

The display device 130 may display a display pointer 903 in the search mode. The display pointer 903 may be moved (or relocated) with respect to the movement of the remote controlling device 150 by using the method described above with reference to FIG. 5. The user may select an image selection mark 920, 930, 940, and 950 by using the display pointer 903.

According to a portion of the embodiment of the present invention, the display device 130 may display both the indicator 901 and the display pointer 903. In such case, the display pointer 903 may be moved (or relocated) with respect to the movement of the remote controlling device 150 by using the method described above with reference to FIG. 5. And, the indicator 901 may be moved (or relocated) with respect to the detection of the user action pressing on the direction key of the remote controlling device 150.

The display device 130 may further display at least one of an icon 921, 931, 941, and 951 and a guidance note 923, 933, 943, and 953 being related to an image indicated by the image selection mark 920, 930, 940, and 950.

The icon 921, 931, 941, and 951 may indicate the image of which specific object is being indicated by the image selection mark 920, 930, 940, and 950. For example, an icon 921 may indicate that the image being indicated by the image selection mark 920 corresponds to the image of a person (or human being). And, another icon 951 may indicate that the image being indicated by the image selection mark 950 corresponds to the image of a shirt. If the image selection mark is incapable of recognizing (or indicating) the image of which specific object is being indicated by the image selection mark, the display device 130 may display icons, such as icon 931 or icon 941.

The guidance note 923, 933, 943, and 953 may include a term including a word or statement for guiding the image selection mark 920, 930, 940, and 950. According to a portion of the embodiment of the present invention, the guidance note 923, 933, 943, and 953 may include at least one of name information, producer information, manufacturer information, and location (or place) information respective to the image indicated by the image selection mark 920, 930, 940, and 950.

In the search mode, the media system 100 may display a display screen in the form of a PIP. More specifically, in the search mode, the display device may further display a sub screen (or secondary screen) in a main screen (or primary screen). According to a portion of the embodiment of the present invention, the primary screen may display an image frame of the content, which had been displayed before the display mode was switched to the search mode, in the form of a still image. And, the secondary screen may continue to display the content, which had been displayed before the display mode was switched to the search mode. For example, in the display screen 900, the image frame of the content 810 may be displayed as a still image on the primary screen 910, and the corresponding content 810 may continue to be displayed on the secondary screen 990. In the disclosure of the present invention, since a secondary screen can be provided in the search mode, this method may be effective in that the user may be capable of viewing the displayed content without any interruption during the process of performing an image search.

In the search mode, the display device 130 may further display a search window 970 and an Execute Search button 975 for receiving a user action, which requests for a search process. The search window 970 may indicate a search term or a recommended search term. When a user action of selecting or pressing on the Execute Search button 975 is detected, a search process is performed by using the search term or recommended search term being indicated on the search window 970 in response to the user action detection.

Figure 10:
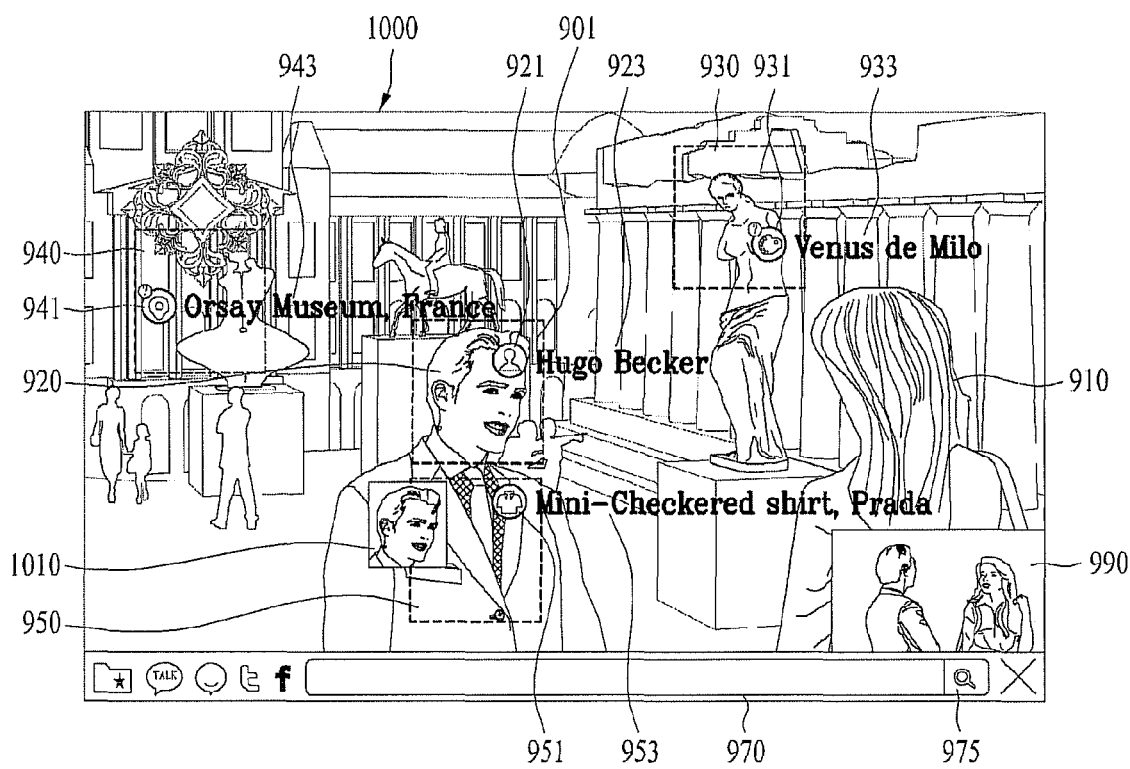
FIG. 10 illustrates a movement of an image.

FIG. 10 illustrates a movement of an image.

Referring to FIG. 10, the display device 130 may display a display screen 1000. The display screen 1000 display a state when an image 1010 is being dragged. The image 1010 corresponds to the image indicated by the image selection mark 920, which is shown in FIG. 9. The user may select one of the image selection marks 920, 930, 940, and 950. And, then, the user may drag an image related to the selected image selection mark 920, 930, 940, and 950.

In a state when the indicator 901 is located over the image selection mark 920, when a user action of pressing on the GRAB button of the remote controlling device 150 is detected, the display device 130 may display the image 1010 as a response to the detected user action, and the image 1010 may be moved (or relocated) with respect to the movement of the remote controlling device 150. Additionally, when a user action of releasing the GRAB button of the remote controlling device 150 is detected, the corresponding image 1010 may disappear.

Figure 11:
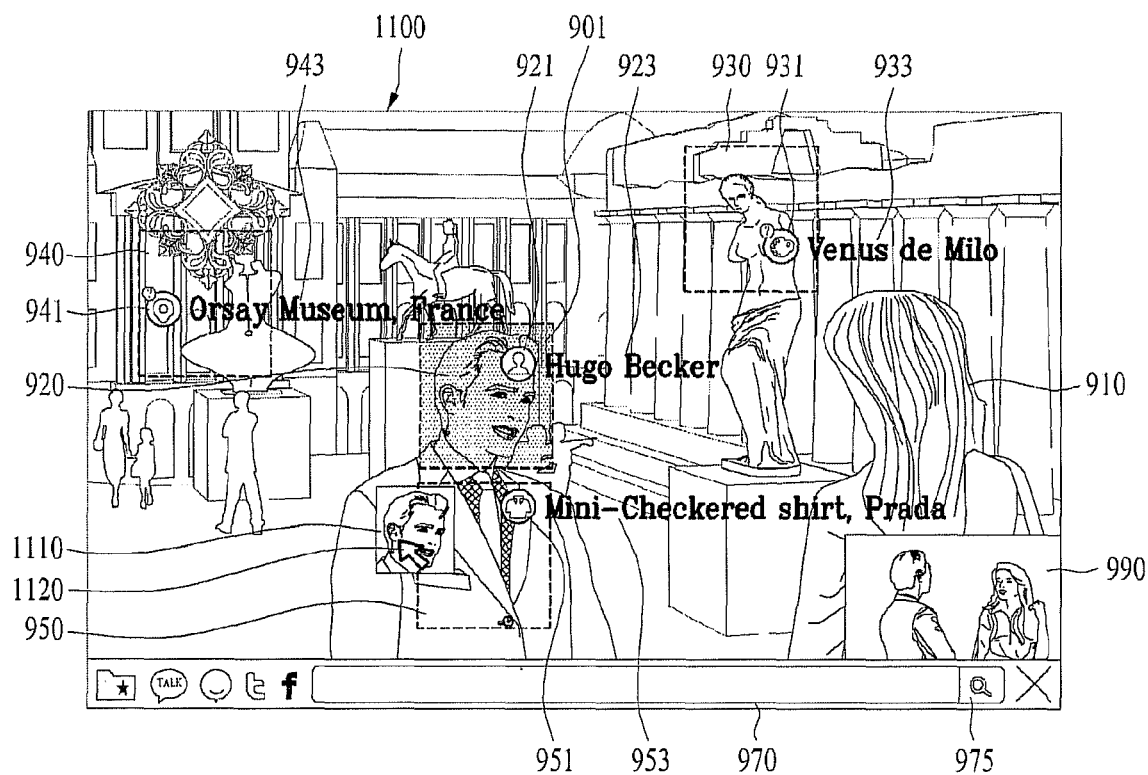
FIG. 11 illustrates another movement of an image.

FIG. 11 illustrates another movement of an image.

Referring to FIG. 11, in a state when the display pointer 903 is located over the image selection mark 950, when a user action of pressing on the GRAB button of the remote controlling device 150 is detected, the display device 130 may display the image 1110 as a response to the detected user action, and the image 1110 and the display pointer 1120 may be simultaneously moved (or relocated) with respect to the movement of the remote controlling device 150. Additionally, when a user action of releasing the GRAB button of the remote controlling device 150 is detected, the corresponding image 1110 may disappear.

According to a portion of the embodiment of the present invention, the image 1110 may be moved (or relocated) in accordance with the moving (or relocating) method of the graphical object, which is described above with reference to FIG. 6.

Figure 12:
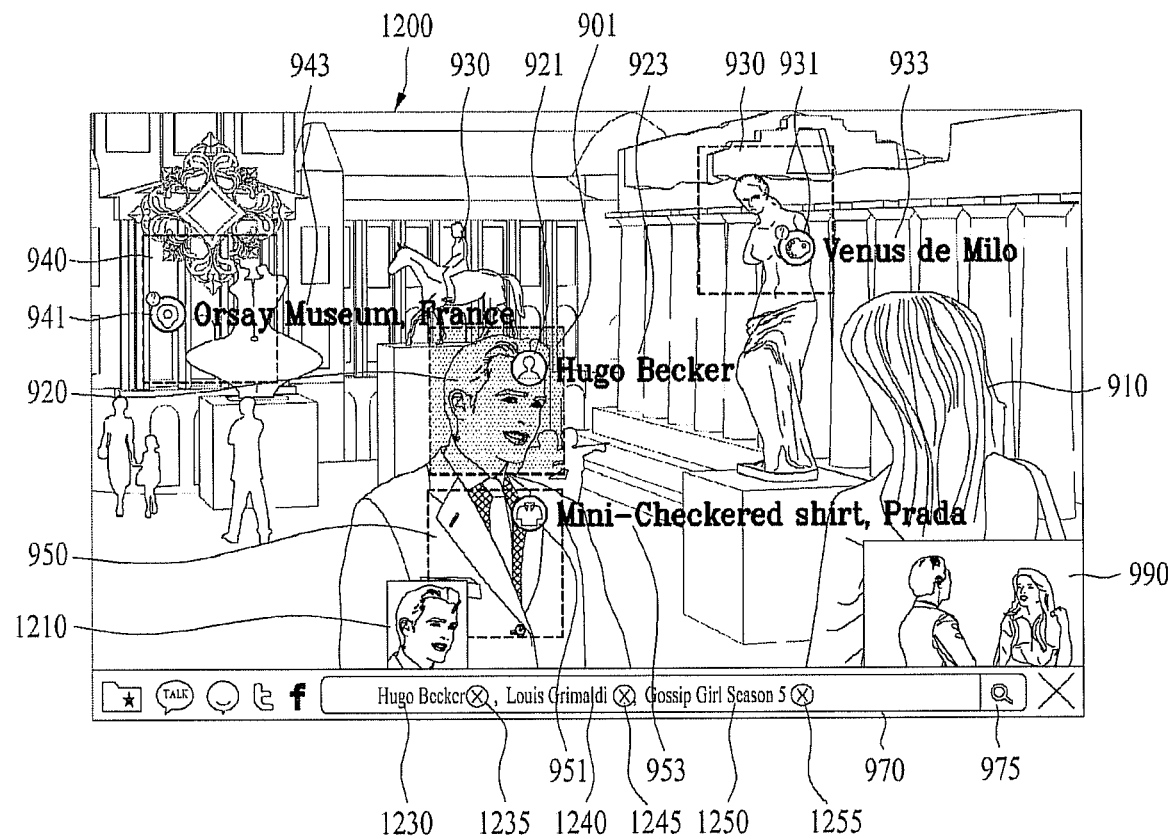
FIG. 12 illustrates a display screen having multiple recommended search terms displayed on a search window.

FIG. 12 illustrates a display screen having multiple recommended search terms displayed on a search window.

Referring to FIG. 12, the display device 130 may display a display screen 1200. An image 1210 of the display screen 1200 corresponds to the image 1010 of FIG. 10 or the image 1110 of FIG. 11 being dragged to the search window 970. The electronic device 110 or the display device 130 may verify whether or not the image 1210 is dragged to the search window 970. In case the image 1210 is dragged to the search window 970, the electronic device 110 provides a term related to the image 1210 as the recommended search term.

When the image 1210 is dragged to the search window 970, the display device 130 displays a term related to the image 1210 as the recommended search term 1230, 1240, and 1250 on the search window 970. Additionally, the display device 130 may further display an icon 1235, 1245, and 1255 for deleting each of the recommended search term 1230, 1240, and 1250.

When a user action of selecting the icon 1235, 1245, and 1255 is detected, the respective search term 1230, 1240, and 1250 is deleted. For example, when a user action of selecting icon 1235 is detected, the electronic device 110 deletes recommended search term 1230. And, then, the display device 130 stops the display of the corresponding recommended search term 1230. More specifically, the recommended search term 1230 is deleted from the search window 970.

Figure 13:
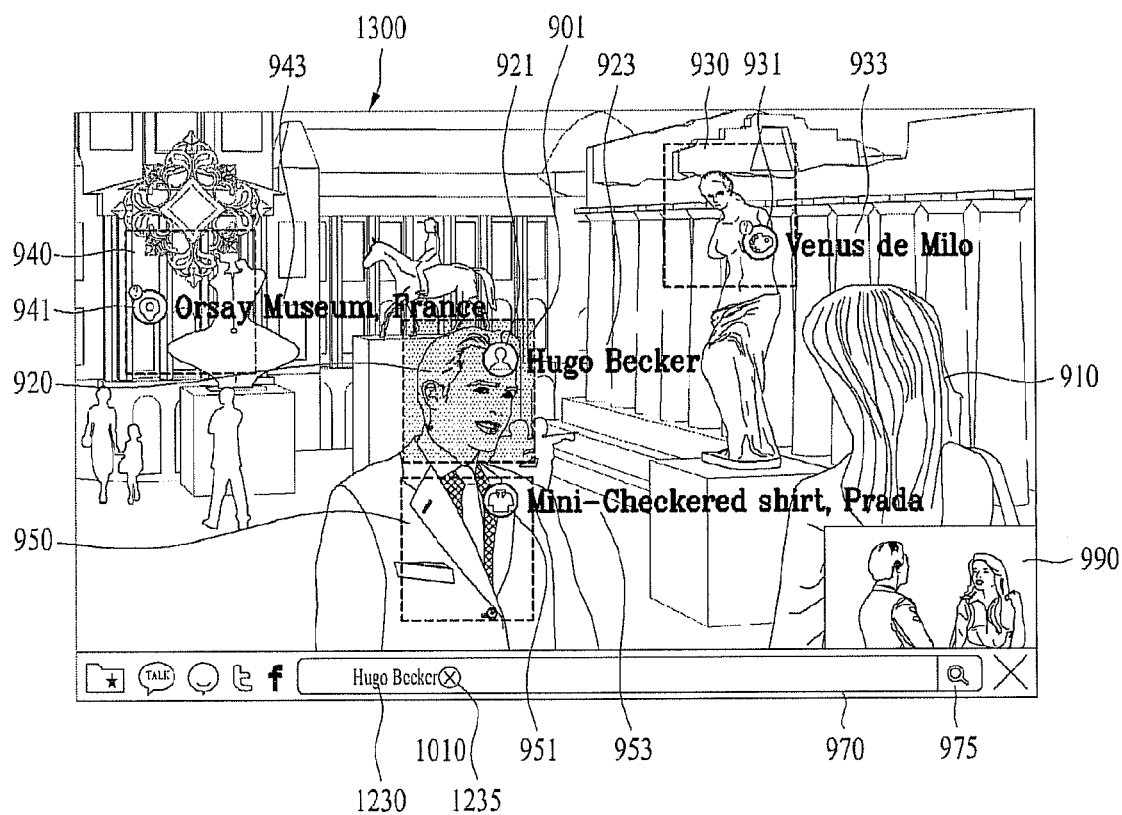
FIG. 13 illustrates the display screen having some of the recommended search terms deleted from the display screen of FIG. 12.

FIG. 13 illustrates the display screen having some of the recommended search term deleted from the display screen of FIG. 12.

Referring to FIG. 13, the electronic device 110 may direct the display device 130 to display a display screen 1300, and, then, the display device 130 may display the display screen 1300. The display screen 1300 may correspond to a display screen of the recommended search term 1240 and the recommended search term 1250 being deleted from the display screen 1200 of FIG. 12. Herein, the icon 1245 related to the recommended search term 1240 and the icon 1255 related to the recommended search term 1250 may also be deleted.

Figure 14:
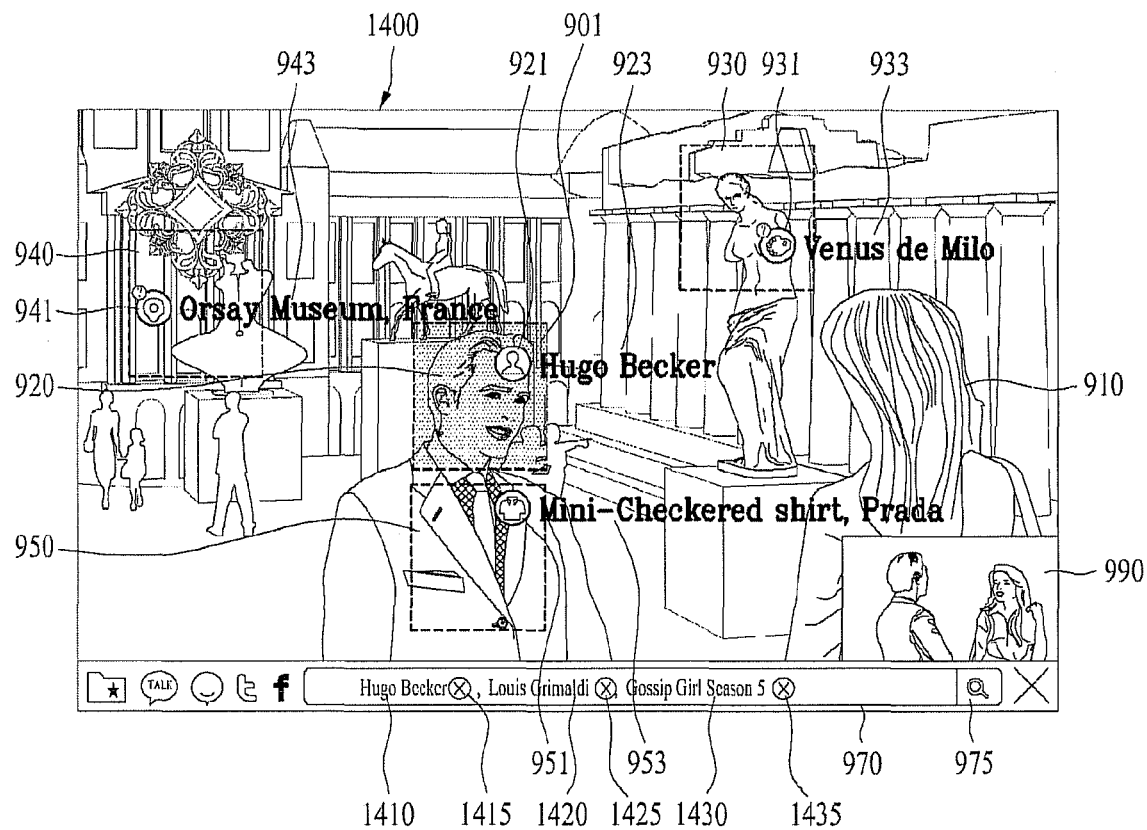
FIG. 14 illustrates a method of selecting a recommended term from the display screen.

FIG. 14 illustrates a method of selecting a recommended search term from the display screen.

Referring to FIG. 14, the display device 130 may display a display screen 1400. The display screen 1400 may correspond to a screen where content is being displayed in the search mode.

When a user action of selecting an image selection mark 920, 930, 940, and 950 is detected, in response to the detected user action, the electronic device 110 may send directions to the display device 130, so that a term including a word or phrase (or statement) related to the selected image selection mark can be displayed on the search window 970 as a recommended search term. And, the display device 130 may then display the term related to the selected image selection mark on the search window 970 as the respective recommended search term.

For example, when a user action of selecting an image selection mark 920 is detected, recommended search term 1410, 1420, and 1430, which are related to the selected image selection mark 920, are displayed on the search window 970. Additionally, icons 1415, 1425, and 1435 for deleting the respective recommended search term 1410, 1420, and 1430 may also be displayed on the display screen 1400. According to a portion of the embodiment of the present invention, the user action may correspond to an action of placing the indicator 901 or display pointer 903 over the image selection mark 920 and of pressing on the GRAB button or OKAY button of the remote controlling device 150.

Figure 15:
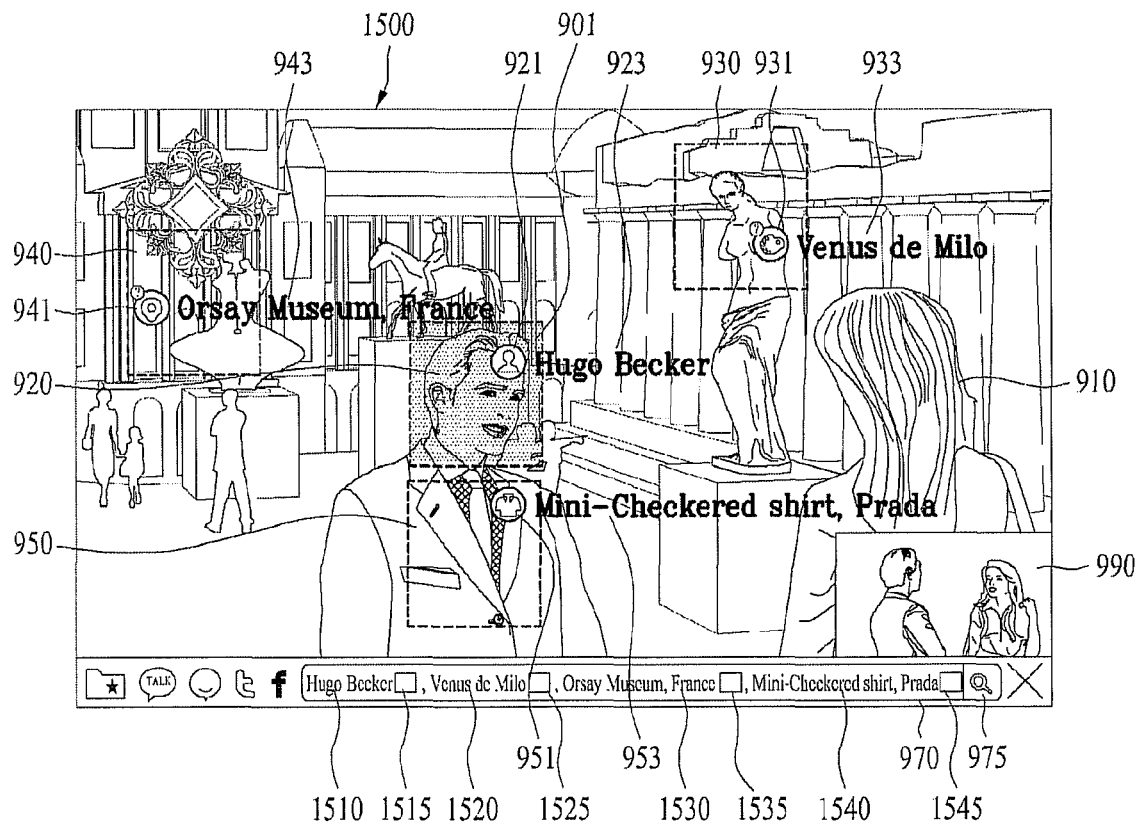
FIG. 15 illustrates a display screen being displayed in a search mode.

FIG. 15 illustrates a display screen being displayed in a search mode.

Referring to FIG. 15, the display device 130 may display a display screen 1500. While the display screen 800, which is shown in FIG. 8, is being displayed, when a user action of requesting for the display mode to be switched to the search mode is detected, the media system 100 may display the display screen 1500.

The search window 970 of the display screen 1500 displays a guidance statement 923, 933, 943, and 953 respective to each of the image selection mark 920, 930, 940, and 950 may be displayed as recommended search terms 1510, 1520, 1530, and 1540. Additionally, the search window 970 may display selection mark 1515, 1525, 1535, and 1545 for selecting the respective recommended search term 1510, 1520, 1530, and 1540.

When a user action of selecting the selection mark 1515, 1525, 1535, and 1545 is detected, a term related to the recommended search term 1510, 1520, 1530, and 1540 respective to the selected selection mark may be displayed on the search window 970 as a new recommended search term. Herein, the term related to the recommended search terms 1510, 1520, 1530, and 1540 may correspond to a term related to the image indicated by the corresponding recommended search terms 1510, 1520, 1530, and 1540.

Figure 16:
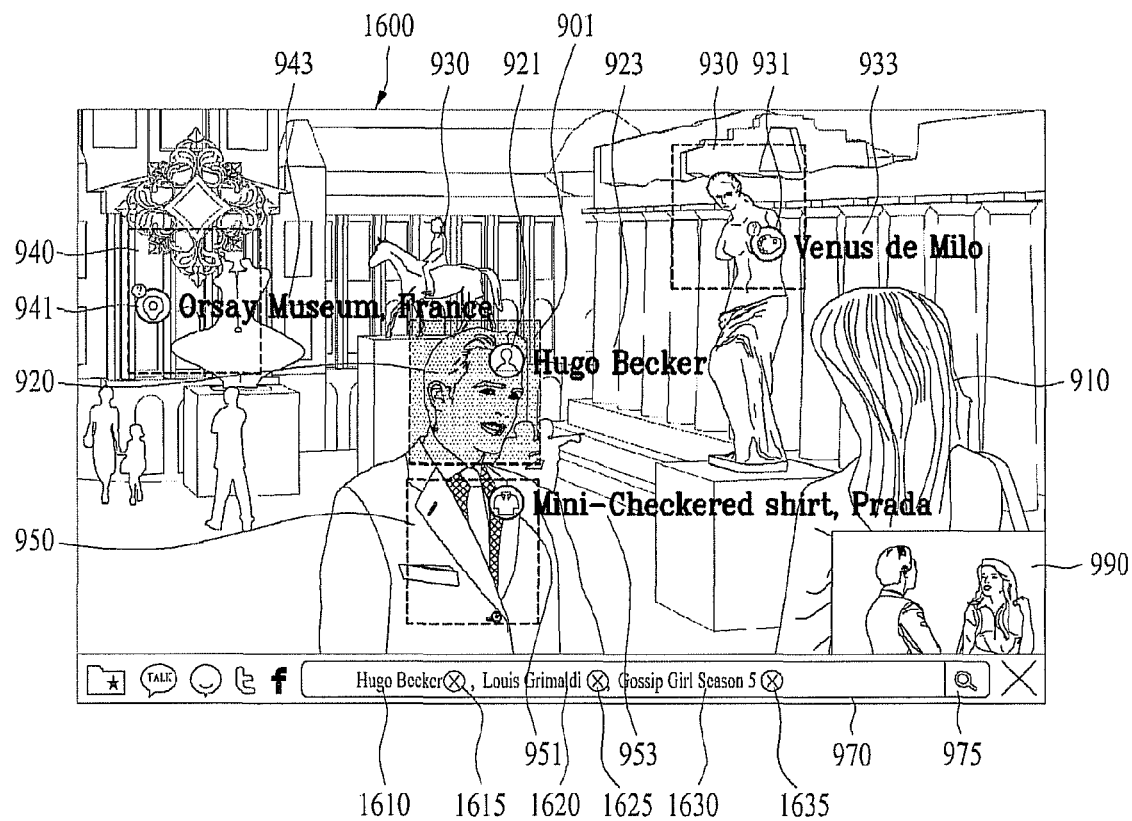
FIG. 16 illustrates a display screen having multiple recommended search terms displayed on a search window.

FIG. 16 illustrates a display screen having multiple recommended search terms displayed on a search window.

Referring to FIG. 16, in a state where the display screen 1500 of FIG. 15 is being displayed, when a user action of selecting the selection mark 1510 is detected, in response to the detected user action, the control unit 110 may send directions to the display device, so that a term related to 'Hugo Becker' 1510 can be displayed on the search window 970 as recommended search terms 1610, 1620, and 1630. Additionally, the display device 130 may further display icons 1615, 1625, and 1635 for deleting the recommended search terms 1610, 1620, and 1630.

Figure 17:
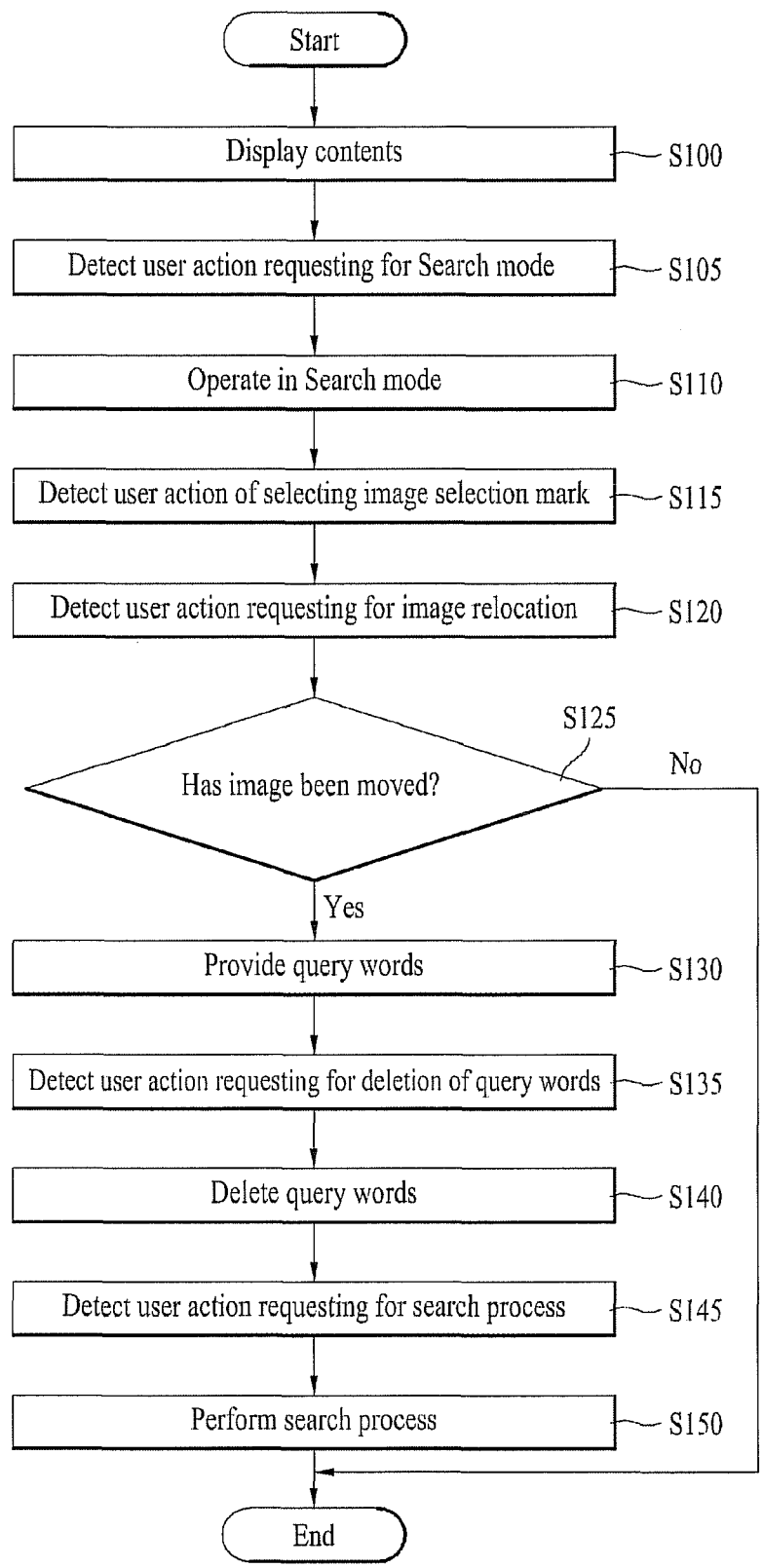
FIG. 17 illustrates a flow chart showing processes step of a method for providing recommended search terms related to a displayed image.

FIG. 17 illustrates a flow chart showing processes step of a method for providing recommended search term related to a displayed image.

Referring to FIG. 17, the electronic device 110 may direct the display device 130 to display content (S100). The display device 130 may display the display screen 800, which is shown in FIG. 8.

The electronic device 110 detects a user action requesting for the search mode to be activated (S105). The user action may correspond to a user action of pressing on a specific button of the remote controlling device 150. According to a portion of the embodiment of the present invention, the specific button may correspond to the GRAB button or the OKAY button.

The media system 100 operates in the search mode (S110). In the search mode, the electronic device 110 temporarily stops the display of the corresponding content and may, then, direct the display device 130 to display the image frame of the corresponding content as a still image. In the search mode, the display device 130 may display the display screen 900, which is shown in FIG. 9.

The electronic device 110 detects a user action of selecting an image selection mark (S115). In response to the detected user action, a graphical feedback indicating that an image indicated by the selected image selection mark has been selected may be provided. According to a portion of the embodiment of the present invention, the graphical feedback may correspond to the display of the image indicated by the selected image selection mark. For example, the graphical feedback may correspond to the display of the image 1010 shown in FIG. 10.

The electronic device 110 detects a user action of requesting for the movement (or relocation) of a selected image (S120). In response to the detected user action, the electronic device 110 moves (or relocates) the image indicated by the image selection mark, which is selected in step S115. The user action may correspond to the movement of the remote controlling device 150. And, in this case, the corresponding image may be dragged with respect to the movement speed and direction of the remote controlling device 150. In step S120, the display device 130 may display the display screen 1000 shown in FIG. 10 or the display screen 1100 shown in FIG. 11.

The electronic device 110 verifies whether or not the image, which is relocated (or moved) in step S120, is moved to the search window (S125).

In case the corresponding image is moved to the search window, the display device 130 displays a term related to the corresponding image on the search window as a recommended search term (S130). Herein, the display device 130 may display the display screen 1200 shown in FIG. 12.

According to a portion of the embodiment of the present invention, when the image, which is relocated (or moved) in step S120, is dropped to the search window, the display device 130 may display the term related to the corresponding image on the search window as the recommended search term. In this embodiment of the present invention, step S125 may be replaced with a step of having the electronic device 110 verify whether or not the relocated (or moved) image has been dropped to the search window.

The electronic device 110 detects a user action requesting for the deletion of the recommended search term, which is displayed on the search window (S135). Herein, the detected user action may correspond to a user action of selecting the icon 1235, 1245, and 1255 shown in FIG. 12.

In response to the detected user action, the electronic device 110 deletes the recommended search term, which has been requested to be deleted, from the search window (S140). When recommended search term 1240 and recommended search term 1250 are requested to be deleted from the search window 970 shown in FIG. 12, the display device 130 may display the search window, which is shown in FIG. 13.

Thereafter, the electronic device 110 detects a user action of requesting for a search process to be performed (S145). Herein, the user action may correspond to the user action of pressing on the Execute Search button 975, which is shown in FIG. 9.

In response to the detected user action, the electronic device 110 performs the requested search process by using the recommended search term displayed on the search window (S150). For example, in case the user action of pressing on the Execute Search button 975 of the display screen 1200, which is shown in FIG. 12, is detected in step S145, a search process is performed in step S150 by using 'Hugo Becker' 1230, 'Louis Grimaldi' 1240, and 'Gossip Girl Season 5' 1250 as the recommended search term. Additionally, in step S145, when the user action of pressing on the Execute Search button 975 of the display screen 1300 shown in FIG. 13 is detected, a search process using 'Hugo Becker' 1230 as the recommended search term is performed in step S150.

In step S150, the electronic device 110 may directly perform the search process from an internal database or an external database. And, the electronic device 110 may send a request to a search server so that the search process can be performed by using the recommended search term. Thereafter, the electronic device 110 may receive the searched result from the search server.

Figure 18:
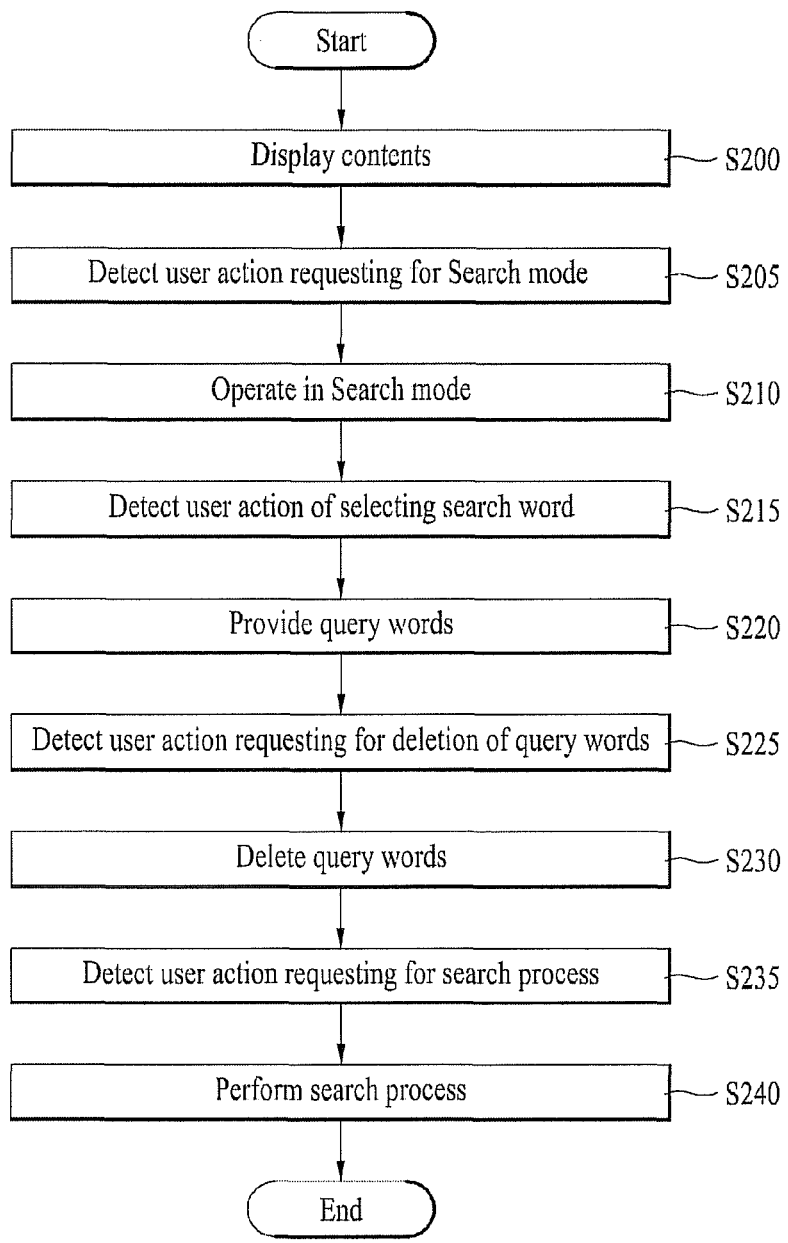
FIG. 18 illustrates another flow chart showing processes step of a method for providing recommended search terms related to a displayed image according to another embodiment of the present invention.

FIG. 18 illustrates another flow chart showing processes step of a method for providing recommended search term related to a displayed image.

Referring to FIG. 18, the electronic device 110 may direct the display device 130 to display content (S200). The display device 130 may display the display screen 800, which is shown in FIG. 8.

The electronic device 110 detects a user action requesting for the search mode to be activated (S205). The user action may correspond to a user action of pressing on a specific button of the remote controlling device 150. According to a portion of the embodiment of the present invention, the specific button may correspond to the GRAB button or the OKAY button.

The media system 100 operates in the search mode (S210). In the search mode, the electronic device 110 temporarily stops the display of the corresponding content and may, then, direct the display device 130 to display the image frame of the corresponding content as a still image. Additionally, in the search mode, the electronic device 110 may provide a guidance note indicating an image or a portion of the corresponding image, which is included in the still image, in the search window as a search term. In the search mode, the display device 130 may display the display screen 1500, which is shown in FIG. 15.

The electronic device detects a user action of selecting a search term (S215). Herein, the user action may correspond to a user action of selecting a selection mark 1515, 1525, 1535, and 1545 shown in FIG. 15.

In case the user action is detected, the display device 130 displays a term related to the image, which is indicated by the selected search term, on the search window as recommended search term (S220). Herein, the display device 130 may display a display screen 1600 shown in FIG. 16.

The electronic device 110 detects a user action requesting for the deletion of the recommended search term, which is displayed on the search window (S225). Herein, the detected user action may correspond to a user action of selecting the icon 1615, 1625, and 1635 shown in FIG. 16.

In response to the detected user action, the electronic device 110 deletes the recommended search term, which has been requested to be deleted, from the search window (S230). When recommended search term 1620 and recommended search term 1630 are requested to be deleted from the search window 970 shown in FIG. 16, the display device 130 may display the search window, which is shown in FIG. 13.

Thereafter, the electronic device 110 detects a user action of requesting for a search process to be performed (S235). Herein, the user action may correspond to the user action of pressing on the Execute Search button 975, which is shown in FIG. 16.

In response to the detected user action, the electronic device 110 performs the requested search process by using the recommended search term displayed on the search window (S240). For example, in case the user action of pressing on the Execute Search button 975 of the display screen 1600, which is shown in FIG. 16, is detected in step S235, a search process is performed in step S235 by using 'Hugo Becker' 1610, 'Louis Grimaldi' 1620, and 'Gossip Girl Season 5' 1630 as the recommended search term. Additionally, in step S235, when the user action of pressing on the Execute Search button 975 of the display screen 1300 shown in FIG. 13 is detected, a search process using 'Hugo Becker' 1610 as the recommended search term is performed in step S240.

In step S240, the electronic device 110 may directly perform the search process from an internal database or an external database. And, the electronic device 110 may send a request to a search server so that the search process can be performed by using the recommended search term. Thereafter, the electronic device 110 may receive the searched result from the search server.

Figure 19:
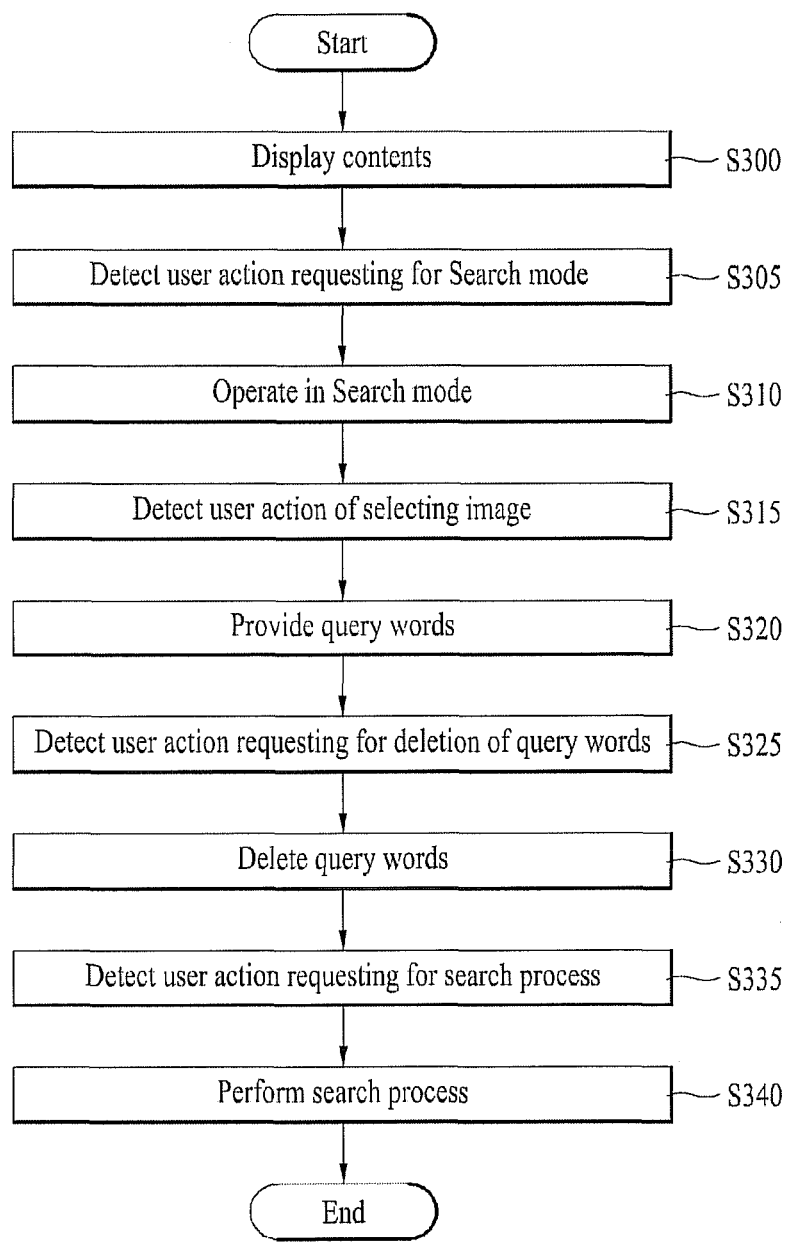
FIG. 19 illustrates the other flow chart showing processes step of a method for providing recommended search terms related to a displayed image.

FIG. 19 illustrates the other flow chart showing processes step of a method for providing recommended search terms related to a displayed image.

Referring to FIG. 19, the electronic device 110 may direct the display device 130 to display content (S300). The display device 130 may display the display screen 800, which is shown in FIG. 8.

The electronic device 110 detects a user action requesting for the search mode to be activated (S305). The user action may correspond to a user action of pressing on a specific button of the remote controlling device 150. According to a portion of the embodiment of the present invention, the specific button may correspond to the GRAB button or the OKAY button.

The media system 100 operates in the search mode (S310). In the search mode, the electronic device 110 temporarily stops the display of the corresponding content and may, then, direct the display device 130 to display the image frame of the corresponding content as a still image. Additionally, in the search mode, the electronic device 110 may provide a guidance note indicating an image or a portion of the corresponding image, which is included in the still image, in the search window as a search term. In the search mode, the display device 130 may display the display screen 900, which is shown in FIG. 9.

The electronic device detects a user action of selecting a search term (S315). Herein, the user action may correspond to a user action of selecting an image selection mark 920, 930, 940, and 950 shown in FIG. 15.

In case the user action is detected, the display device 130 displays a term related to the selected image on the search window as recommended search term (S320). When the image selection mark 920 is selected from the display screen 900 of FIG. 9, the display device 130 may display a display screen 1400 shown in FIG. 14.

The electronic device 110 detects a user action requesting for the deletion of the recommended search term, which is displayed on the search window (S325). Herein, the detected user action may correspond to a user action of selecting the icon 1415, 1425, and 1435 shown in FIG. 14.

In response to the detected user action, the electronic device 110 deletes the recommended search term, which has been requested to be deleted, from the search window (S330). When recommended search term 1420 and recommended search term 1430 are requested to be deleted from the search window 970 shown in FIG. 14, the display device 130 may display the search window, which is shown in FIG. 13.

Thereafter, the electronic device 110 detects a user action of requesting for a search process to be performed (S335). Herein, the user action may correspond to the user action of pressing on the Execute Search button 975, which is shown in FIG. 14.

In response to the detected user action, the electronic device 110 performs the requested search process by using the recommended search term displayed on the search window (S340). For example, in case the user action of pressing on the Execute Search button 975 of the display screen 1400, which is shown in FIG. 14, is detected in step S335, a search process is performed in step S335 by using 'Hugo Becker' 1410, 'Louis Grimaldi' 1420, and 'Gossip Girl Season 5' 1430 as the recommended search term. Additionally, in step S335, when the user action of pressing on the Execute Search button 975 of the display screen 1300 shown in FIG. 13 is detected, a search process using 'Hugo Becker' 1410 as the recommended search term is performed in step S340.

In step S340, the electronic device 110 may directly perform the search process from an internal database or an external database. And, the electronic device 110 may send a request to a search server so that the search process can be performed by using the recommended search term. Thereafter, the electronic device 110 may receive the searched result from the search server.

The description provided in the disclosure of the present invention may be realized as a code that can be read by a computer in a recording medium that can be read by the computer. The recording medium that can be read by the computer includes all types of recording devices storing data that can be read by the computer device. Examples of the recording media that can be read by a computer may include ROMs, RAMs, magnetic tapes, floppy disks, optical data storing devices, and so on. Also, an exemplary recording medium being realized in the form of a carrier wave (e.g., a transmission via Internet) may also be included. Also, the recording medium that can be read by a computer may be scattered within a computer device, which is connected through a network. And, a code that can be read by the computer may be stored and executed by using a dispersion (or scattering) method.

As described above, the media system and the method of providing recommended search term corresponding to an image have the following advantages. According to the embodiment of the present invention, since particular terms that are related to a specific image are displayed on a search window as multiple recommended search terms, the user may be capable of easily searching for information related to the specific image by referring to the recommended search terms displayed on the search window without having to go through a process of inputting a recommended search term.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A digital television receiver for processing a search operation, the digital television receiver comprising:
   a user interface configured to receive a first control signal for executing a first application in a normal mode and a second control signal for requesting a search mode from a remote controller;
   a storage configured to store application data of the first application;
   a controller configured to:
   detect, while displaying the first application in the normal mode, said second control signal,
   control automatically entering into the search mode in response to the detected second control signal,
   display, in the search mode, a second application including a search window and a menu item including a first icon along with the first application on a single display screen, wherein the first icon corresponds to a third application for the search operation; and
   perform, in the search mode, the search operation; and
   a display,
   wherein the first application is at least one of a broadcast program, a web application, a video, an image, a streaming content or a downloaded content,
   wherein the second application is switched into the third application in response to selecting the first icon,
   wherein the search window displays a plurality of search terms, a second icon at each search term for selecting the corresponding search term, and a search button,
   wherein, when the second icons are selected, the search window displays a new recommended search term based on at least two search terms corresponding to the selected second icons from the plurality of search terms, and
   wherein at least one of the first control signal and the second control signal is received through at least one of a physical or soft button, a touch, a gesture and a voice of the distal television receiver or the remote controller.

2. The digital television receiver of claim 1, wherein the single display screen is configured to display the search window, the single display screen to display the search term on the search window, and the single display screen to display the search button.

3. The digital television receiver of claim 2, wherein the normal mode includes displaying the first application entirely throughout the single display screen.

4. The digital television receiver of claim 1, wherein the normal mode is maintained before the user interface receives the second control signal for requesting the search mode.

5. The digital television receiver of claim 1, wherein the search mode includes displaying the search window on the single display screen.

6. The digital television receiver of claim 1, further comprising a network interface configured to transmit and receive internet protocol (IP) packets.

7. The digital television receiver of claim 1, further comprising a network interface configured to receive at least one of the first application and the second application from a server.

8. The digital television receiver of claim 1, further comprising at least one of:
   an external signal receiving unit configured to receive contents;
   a demodulator to couple to a tuner; and
   a demultiplexer to couple to the demodulator.

9. The digital television receiver of claim 1, wherein the controller is further configured to display an image mark for selecting an object of the displayed broadcast data in response to a third control signal, the image mark including an icon for identifying the object and a guide note for specifying the object, the icon included in the image mark including a representative image corresponding to one or more search terms related to the object.

10. The digital television receiver of claim 1, wherein the controller is further configured to display a menu including multiple menu items and an indicator for selecting a menu item form the multiple menu items in response to a second control signal from the remote controller, the multiple menu items including at least one of an item representing a setting icon of the digital television receiver, an item representing an electronic program guide (EPG), an item for switching a three-dimensional (3D), an item for accessing a messenger application, or an item for executing a camera.

11. A digital television receiver comprising:
   a user interface configured to receive a first control signal for executing a first application in a normal mode and a second control signal for requesting a search mode from a remote control device;
   a storage configured to store application data in the normal mode;
   a controller configured to:

display the first application on a display screen while in a normal display mode, detect the second control signal while displaying the first application on the display screen, determine the received second control signal requesting the search mode, automatically enter into the search mode in response to the determination that the received second control signal requests the search mode, after entering into the search mode, display a second application including a search window and a menu item including a first icon along with the first application on the display screen while in the search mode, wherein the first icon corresponds to a third application for the search operation, and perform the search operation; and a display, wherein the first application is at least one of a broadcast program, a web application, a video, an image, a streaming content or a downloaded content;

wherein the second application is switched into the third application in response to selecting the first icon, wherein the search window displays a plurality of search terms, a second icon at each search term for selecting the corresponding search term, and a search button, wherein, when the second icons are selected, the search window displays a new recommended search term based on at least two search terms corresponding to the selected second icons from the plurality of search terms, and wherein at least one of the first and second control signal is received through at least one of a physical or soft button, a touch, a gesture and a voice of the digital television receiver or the remote controller.

12. The digital television receiver of claim 11, wherein the normal display mode includes displaying the first application on the entire display screen.

13. The digital television receiver of claim 11, wherein the controller maintains the normal display mode prior to determining that the second control signal requests the search mode.

14. The digital television receiver of claim 11, wherein the second control signal changes an operation of the screen from the normal display mode to the search mode.

15. The digital television receiver of claim 11, wherein the controller is further configured to display an image mark for selecting an object of the displayed broadcast data in response to a third control signal, the image mark including an icon for identifying the object and a guide note for specifying the object, the icon included in the image mark including a representative image corresponding to one or more search terms related to the object.

16. The digital television receiver of claim 11, wherein the controller is further configured to display a menu including multiple menu items and an indicator for selecting a menu item form the multiple menu items in response to a second control signal from the remote controller, the multiple menu items including at least one of an item representing a setting icon of the digital television receiver, an item representing an electronic program guide (EPG), an item for switching a three-dimensional (3D), an item for accessing a messenger application, or an item for executing a camera.

17. A digital television receiver comprising:
a user interface configured to receive control signals from a remote controller;
a storage;
a controller configured to:
cause a tuner to receive a broadcast signal including broadcast data and information data;
cause a demultiplexer to demultiplex the broadcast data and information data from the received broadcast signal;
cause a decoder to decode the received broadcast data and information data;
display broadcast data on a screen,
display an application including a search window related to a first search server and a menu item containing a first icon for a search operation in response to a first control signal on the displayed broadcast data, and
perform the search operation; and
a display,
wherein the controller is further configured to perform the search operation in response to selecting the first icon,
wherein the search window includes a plurality of search terms, a second icon at each search term for selecting the corresponding search term, and a search button, and
wherein, when the second icons are selected, the search window displays a new recommended search term based on at least two search terms corresponding to the selected second icons from the plurality of search terms.

18. The digital television receiver of claim 17, wherein the controller is further configured to display a menu including multiple menu items and an indicator for selecting a menu item form the multiple menu items in response to a second control signal from the remote controller, the multiple menu items including at least one of an item representing a setting icon of the digital television receiver, an item representing an electronic program guide (EPG), an item for switching a three-dimensional (3D), an item for accessing a messenger application, or an item for executing a camera.

19. The digital television receiver of claim 17, wherein the controller is further configured to display an image mark for selecting an object of the displayed broadcast data in response to a third control signal, the image mark including an icon for identifying the object and a guide note for specifying the object, the icon included in the image mark including a representative image corresponding to one or more search terms related to the object.

* * * * *